United States Patent
Kobayashi et al.

(10) Patent No.: US 12,362,365 B2
(45) Date of Patent: Jul. 15, 2025

(54) METAL-SUPPORTED CATALYST, BATTERY ELECTRODE, AND BATTERY

(71) Applicant: NISSHINBO HOLDINGS INC., Tokyo (JP)

(72) Inventors: Yoshikazu Kobayashi, Chiba (JP); Takeaki Kishimoto, Funabashi (JP); Takuya Ishizuka, Chiba (JP); Takuya Isaka, Chiba (JP); Miki Meguro, Funabashi (JP)

(73) Assignee: NISSHINBO HOLDINGS INC., Tokyo (JP)

( * ) Notice: Subject to any disclaimer, the term of this patent is extended or adjusted under 35 U.S.C. 154(b) by 834 days.

(21) Appl. No.: 17/631,263

(22) PCT Filed: Jul. 2, 2020

(86) PCT No.: PCT/JP2020/026044
§ 371 (c)(1),
(2) Date: Jan. 28, 2022

(87) PCT Pub. No.: WO2021/024657
PCT Pub. Date: Feb. 11, 2021

(65) Prior Publication Data
US 2022/0302467 A1    Sep. 22, 2022

(30) Foreign Application Priority Data
Aug. 2, 2019  (JP) ................................ 2019-143405

(51) Int. Cl.
*H01M 4/92*  (2006.01)
*H01M 4/86*  (2006.01)

(52) U.S. Cl.
CPC ......... *H01M 4/921* (2013.01); *H01M 4/8605* (2013.01); *H01M 4/926* (2013.01)

(58) Field of Classification Search
CPC ...... H01M 4/921; H01M 4/926; H01M 4/925; H01M 4/90; H01M 4/92;
(Continued)

(56) References Cited

U.S. PATENT DOCUMENTS 4,447,506 A   5/1984   Luczak et al.
4,613,582 A   9/1986   Luczak et al.
(Continued)

FOREIGN PATENT DOCUMENTS

CA    2 941 994 A1   9/2015
CA    3 069 288 A1   1/2019
(Continued)

OTHER PUBLICATIONS

Sep. 29, 2020 International Search Report issued in Patent Application No. PCT/JP2020/026045.
(Continued)

*Primary Examiner* — Matthew W Van Oudenaren
(74) *Attorney, Agent, or Firm* — Oliff PLC

(57) ABSTRACT

A metal-supported catalyst, a battery electrode, and a battery, each having both excellent catalytic activity and durability. The metal-supported catalyst includes: a carbon carrier; and platinum particles serving as catalyst metal particles supported on the carbon carrier, wherein the platinum particles contain pure platinum particles and platinum alloy particles, wherein a proportion of a weight of the pure platinum particles to a sum of the weight of the pure platinum particles and a weight of the platinum alloy particles is 15% or more and 61% or less, and wherein a ratio of a proportion of a nitrogen atom content to a carbon atom content measured by elemental analysis using a combustion method, to a proportion of a nitrogen atom content to a carbon atom content measured by X-ray photoelectron spectroscopy, is 1.05 or more.

15 Claims, 9 Drawing Sheets

(58) Field of Classification Search
CPC ... H01M 2004/8689; H01M 2004/8684; B01J 21/18; B01J 23/8906; B01J 23/8913; B01J 23/42; B01J 23/892; B01J 23/89; B01J 35/617; B01J 35/647; B01J 37/0205; C01P 2002/82; C01P 2006/12; C01P 2006/14; C01P 2006/16
See application file for complete search history.

(56) References Cited

U.S. PATENT DOCUMENTS

| | | | |
|---|---|---|---|
| 4,677,092 | A | 6/1987 | Luczak et al. |
| 4,711,829 | A | 12/1987 | Luczak et al. |
| 5,525,568 | A | 6/1996 | Yamaguchi et al. |
| 8,993,164 | B2 | 3/2015 | Matsuzaka et al. |
| 9,029,043 | B2 | 5/2015 | Lee et al. |
| 2003/0044655 | A1 | 3/2003 | Kato et al. |
| 2007/0129567 | A1 | 6/2007 | Leiber et al. |
| 2007/0184972 | A1 | 8/2007 | Roev et al. |
| 2007/0224479 | A1 | 9/2007 | Tadokoro et al. |
| 2009/0130502 | A1 | 5/2009 | Liu et al. |
| 2009/0247401 | A1 | 10/2009 | Mei et al. |
| 2009/0326262 | A1 | 12/2009 | Wan |
| 2010/0183942 | A1 | 7/2010 | Takahashi et al. |
| 2010/0316937 | A1 | 12/2010 | Sakamoto et al. |
| 2010/0323272 | A1* | 12/2010 | Ozaki .............. H01G 11/42 423/384 |
| 2011/0207019 | A1 | 8/2011 | Mukerjee |
| 2012/0028169 | A1 | 2/2012 | Roh et al. |
| 2012/0231338 | A1 | 9/2012 | Matsuzaka et al. |
| 2013/0023406 | A1 | 1/2013 | Wan |
| 2015/0228985 | A1 | 8/2015 | Serov et al. |
| 2015/0295250 | A1 | 10/2015 | Nagami et al. |
| 2015/0352522 | A1 | 12/2015 | Mizuuchi et al. |
| 2016/0013495 | A1 | 1/2016 | Ishida et al. |
| 2016/0020475 | A1 | 1/2016 | Serov et al. |
| 2016/0068555 | A1 | 3/2016 | Wan |
| 2016/0087281 | A1 | 3/2016 | Mashio et al. |
| 2017/0033368 | A1 | 2/2017 | Carpenter et al. |
| 2017/0200956 | A1 | 7/2017 | Nagami et al. |
| 2017/0244125 | A1 | 8/2017 | Takahashi et al. |
| 2017/0250432 | A1 | 8/2017 | Takahashi et al. |
| 2018/0008968 | A1* | 1/2018 | Pham-Huu ........... B01J 37/0244 |
| 2018/0013158 | A1 | 1/2018 | Nagamori et al. |
| 2018/0044805 | A1 | 2/2018 | Serov et al. |
| 2018/0097238 | A1 | 4/2018 | Kongkanand et al. |
| 2018/0117566 | A1 | 5/2018 | Witte et al. |
| 2018/0166696 | A1 | 6/2018 | Itoh et al. |
| 2019/0143308 | A1 | 5/2019 | Kishimoto et al. |
| 2019/0355995 | A1 | 11/2019 | Mashio et al. |
| 2020/0127301 | A1 | 4/2020 | Sato et al. |
| 2020/0171470 | A1 | 6/2020 | Kubota et al. |
| 2020/0321622 | A1* | 10/2020 | Sharman ............. H01M 4/8828 |
| 2020/0321629 | A1 | 10/2020 | Nagami et al. |
| 2021/0020954 | A1 | 1/2021 | Park et al. |
| 2022/0285696 | A1 | 9/2022 | Kubota et al. |

FOREIGN PATENT DOCUMENTS

| | | |
|---|---|---|
| CA | 3 069 575 A1 | 1/2019 |
| CN | 1947289 A | 4/2007 |
| CN | 101427406 A | 5/2009 |
| CN | 101682041 A | 3/2010 |
| CN | 102076409 A | 5/2011 |
| CN | 102648050 A | 8/2012 |
| CN | 103721736 A | 4/2014 |
| CN | 104028291 A | 9/2014 |
| CN | 104812488 A | 7/2015 |
| CN | 105006578 A | 10/2015 |
| CN | 105074981 A | 11/2015 |
| CN | 105142784 A | 12/2015 |
| CN | 106410222 A | 2/2017 |
| CN | 106922203 A | 7/2017 |
| CN | 106960966 A | 7/2017 |
| CN | 107078307 A | 8/2017 |
| CN | 107887617 A | 4/2018 |
| CN | 108232214 A | 6/2018 |
| CN | 109155417 A | 1/2019 |
| EP | 3460890 A1 | 3/2019 |
| JP | 862-155940 A | 7/1987 |
| JP | H07-155618 A | 6/1995 |
| JP | 2003-045442 A | 2/2003 |
| JP | 2008-153146 A | 7/2008 |
| JP | 2011-016125 A | 1/2011 |
| JP | 2011-115760 A | 6/2011 |
| JP | 2015-523694 A | 8/2015 |
| JP | 2017-147187 A | 8/2017 |
| JP | 2018-181739 A | 11/2018 |
| JP | 2019-517110 A | 6/2019 |
| KR | 10-2004-0080010 A | 9/2004 |
| KR | 10-2007-0080484 A | 8/2007 |
| KR | 10-2018-0042874 A | 4/2018 |
| KR | 20230019768 A | 2/2023 |
| WO | 2014/126077 A1 | 8/2014 |
| WO | 2014/164822 A1 | 10/2014 |
| WO | 2015/034521 A1 | 3/2015 |
| WO | 2015/178459 A1 | 11/2015 |
| WO | 2016/133921 A1 | 8/2016 |
| WO | 2016/157897 A1 | 10/2016 |
| WO | 2017/199653 A1 | 11/2017 |
| WO | 2019/013050 A1 | 1/2019 |
| WO | 2019/013052 A1 | 1/2019 |

OTHER PUBLICATIONS

Sep. 24, 2020 International Search Report issued in Patent Application No. PCT/JP2020/026044.

Sep. 15, 2020 International Search Report issued in Patent Application No. PCT/JP2020/026043.

Nie, Y. et al., "Promoting stability and activity of PtNi/C for oxygen reduction reaction via polyaniline-confined space annealing strategy", Int. J. Hydorg. Energy, Feb. 7, 2019, vol. 44, No. 12, pp. 5921-5928.

Gottlieb, E. et al., "In-Situ Platinum Deposition on Nitrogen-Doped Carbon Films as a Source of Catalytic Activity in a Hydrogen Evolution Reaction", ACS Applied Materials & Interfaces, Jul. 21, 2016, vol. 8, pp. 21531-21538.

U.S. Appl. No. 17/631,304, filed Jan. 28, 2022 in the name of Tetsutaro Sato et al.

U.S. Appl. No. 17/631,243, filed Jan. 28, 2022 in the name of Yuji Kubota et al.

Mar. 8, 2024 U.S. Office Action issued in U.S. Appl. No. 17/631,243.

Mar. 27, 2023 Office Action issued in Chinese Patent Application No. 202080055893.3.

Jul. 3, 2024 Notice of Allowance received in U.S. Appl. No. 17/631,243.

Oct. 17, 2023 Office Action issued in Chinese Patent Application No. 202080055894.8.

Jun. 11, 2024 Office Action issued in Indian Patent Application No. 202227009625.

Sep. 25, 2024 Notice of Allowance issued in U.S. Appl. No. 17/631,304.

Sep. 16, 2024 extended Search Report issued in European Patent Application No. 20851067.7.

Apr. 22, 2024 Office Action issued in Indian Patent Application No. 202227009764.

Samad et al. "Carbon and non-carbon support materials for platinum-based catalysts in fuel cells", International Journal of Hydrogen Energy XXX, 2018, pp. 1-32.

Isaifan et al. "Particle size effect on catalytic activity of carbon-supported Pt nanoparticles for complete ethylene oxidation", Applied Catalysis A: General 464-465, May 25, 2013, pp. 87-94.

* cited by examiner

FIG.2

|  |  | PURE Pt | Pt ALLOY 1 | Pt ALLOY 2 | Pt ALLOY 3 |
|---|---|---|---|---|---|
| EXAMPLE 6 | CRYSTALLITE DIAMETER | 3.9nm | 24.5nm | 4.9nm | 5.2nm |
|  | PROPORTION | 52.3% | 3.4% | 30.4% | 13.9% |

FIG.6A

| | PROPORTION(%) | | N-CHN/XPS RATIO | SPECIFIC SURFACE AREA (m²/g-CARRIER) | PORE VOLUME(cm³/g-CARRIER) | | | PARTICLE DIAMETER OF CATALYST METAL (Pt) PARTICLES | | CO-ECSA (m²/g-PLATINUM) | MEA PERFORMANCE | | DURABILITY |
|---|---|---|---|---|---|---|---|---|---|---|---|---|---|
| | | | | | | | | | | | INITIAL PERFORMANCE | | |
| | PURE Pt | Pt ALLOY | | | 0.5-2.0nm | 2.0-4.0nm | 4.0-50nm | PROPORTION OF 5.0 nm OR LESS(%) | AVERAGE CRYSTALLITE DIAMETER(nm) | | VOLTAGE AT 0.2 A/cm² (mV) | MAXIMUM OUTPUT DENSITY (mW/cm²) | VOLTAGE DECREASE AMOUNT AFTER 2,100 CYCLES(mV) |
| EXAMPLE 1 | 0.0 | 100.0 | 1.52 | 1705 | 0.59 | 0.41 | 0.54 | 92.5 | 4.14 | 106 | 814 | 965 | 76 |
| EXAMPLE 2 | 20.1 | 79.9 | 1.30 | 1071 | 0.22 | 0.17 | 0.91 | 66.32 | 6.20 | 72 | 816 | 980 | 51 |
| EXAMPLE 3 | 39.4 | 60.6 | 1.25 | 1538 | 0.51 | 0.40 | 0.51 | 85.1 | 4.53 | 59 | 822 | 1067 | 11 |
| EXAMPLE 4 | 43.0 | 57.0 | 1.59 | 1310 | 0.54 | 0.20 | 0.21 | 81.2 | 7.40 | 76 | 830 | 852 | 35 |
| EXAMPLE 5 | 49.3 | 50.7 | 1.43 | 1621 | 0.53 | 0.38 | 0.64 | 82.9 | 4.07 | 93 | 839 | 1115 | 32 |
| EXAMPLE 6 | 52.3 | 47.7 | 1.32 | 1571 | 0.52 | 0.40 | 0.52 | 82.7 | 5.09 | 73 | 832 | 1116 | 12 |
| EXAMPLE 7 | 61.3 | 38.7 | 1.03 | 1048 | 0.13 | 0.35 | 1.09 | 71.8 | 5.55 | 79 | 816 | 916 | 54 |
| EXAMPLE 8 | 64.6 | 35.4 | 1.34 | 1120 | 0.23 | 0.18 | 1.36 | 79.4 | 6.81 | 61 | 806 | 906 | 43 |
| EXAMPLE 9 | 100.0 | 0.0 | 1.33 | 1758 | 0.63 | 0.49 | 0.58 | 96.4 | 3.79 | 73 | 808 | 1054 | 25 |

FIG.6B

| | N/C RATIO | | | RAMAN SPECTROSCOPY | | | TPD NITROGEN DESORPTION AMOUNT (mol/g) | | TPD NITROGEN DESORPTION AMOUNT (mol/g-CARRIER) | |
|---|---|---|---|---|---|---|---|---|---|---|
| | (I) CHN-N/C (wt%/wt%) | (II) XPS-N/C (atm%/atm%) | N-CHN/XPS (I)/((II)*14/12) | Iv/Ig RATIO | D BAND FULL WIDTH AT HALF MAXIMUM (cm⁻¹) | G BAND FULL WIDTH AT HALF MAXIMUM (cm⁻¹) | 600–1000°C | 800–1000°C | 600–1000°C | 800–1000°C |
| EXAMPLE 1 | 0.0320 | 0.0181 | 1.52 | 0.38 | 147 | 77.5 | 7.51E-03 | 2.16E-04 | 9.38E-03 | 2.70E-04 |
| EXAMPLE 2 | 0.0218 | 0.0144 | 1.30 | 0.22 | 96 | 84.8 | 7.74E-05 | 2.32E-05 | 3.55E-03 | 1.07E-03 |
| EXAMPLE 3 | 0.0230 | 0.0158 | 1.25 | 0.31 | 134 | 76.8 | 4.73E-03 | 2.04E-04 | 6.89E-03 | 2.97E-04 |
| EXAMPLE 4 | 0.0221 | 0.0119 | 1.59 | 0.36 | 153 | 69.0 | 2.67E-05 | 2.08E-05 | 3.50E-05 | 2.72E-05 |
| EXAMPLE 5 | 0.0278 | 0.0167 | 1.43 | 0.32 | 145 | 70.6 | 7.33E-03 | 2.11E-04 | 9.38E-03 | 2.70E-04 |
| EXAMPLE 6 | 0.0237 | 0.0154 | 1.32 | 0.32 | 141 | 74.6 | 5.82E-03 | 1.81E-04 | 8.51E-03 | 2.65E-04 |
| EXAMPLE 7 | 0.0081 | 0.0067 | 1.03 | 0.29 | 97 | 83.1 | 7.34E-06 | 6.03E-06 | 9.00E-06 | 7.40E-06 |
| EXAMPLE 8 | 0.0226 | 0.0145 | 1.34 | 0.23 | 98 | 85.6 | 8.03E-05 | 2.41E-05 | 3.55E-03 | 1.07E-03 |
| EXAMPLE 9 | 0.0283 | 0.0182 | 1.33 | 0.30 | 124 | 66.5 | 7.33E-03 | 2.10E-04 | 2.59E-01 | 7.42E-03 |

FIG.6C

| | PORE VOLUME (cm³/g) | | | BET SPECIFIC SURFACE AREA (m²/g) | PARTICLE DIAMETER OF METAL-SUPPORTED CATALYST (μm) | ECSA (m²/g-PLATINUM) | | NON-CATALYST METAL ACTIVE SITE Pt EQUIVALENT (mg-Pt/g-CARRIER) |
|---|---|---|---|---|---|---|---|---|
| | 0.5–2.0nm | 2.0–4.0nm | 4.0–50nm | | | $H_2$ | CO | |
| EXAMPLE 1 | 0.47 | 0.32 | 0.43 | 1365 | 0.14 | 64 | 106 | 40.0 |
| EXAMPLE 2 | 0.15 | 0.12 | 0.89 | 726 | 0.14 | 36 | 72 | 0.8 |
| EXAMPLE 3 | 0.35 | 0.27 | 0.35 | 1057 | 0.11 | 37 | 59 | 40.0 |
| EXAMPLE 4 | 0.42 | 0.15 | 0.16 | 999 | 0.09 | 55 | 76 | 28.5 |
| EXAMPLE 5 | 0.41 | 0.29 | 0.50 | 1267 | 0.18 | 64 | 93 | 40.0 |
| EXAMPLE 6 | 0.36 | 0.28 | 0.35 | 1074 | 0.10 | 38 | 68 | 40.0 |
| EXAMPLE 7 | 0.11 | 0.29 | 0.89 | 854 | 0.11 | 62 | 79 | 0.4 |
| EXAMPLE 8 | 0.18 | 0.14 | 1.06 | 858 | 0.14 | 49 | 61 | 0.8 |
| EXAMPLE 9 | 0.51 | 0.39 | 0.46 | 1406 | 0.10 | 58 | 73 | 40.0 |

METAL-SUPPORTED CATALYST, BATTERY ELECTRODE, AND BATTERY

TECHNICAL FIELD

The present invention relates to a metal-supported catalyst, a battery electrode, and a battery.

BACKGROUND ART

In Patent Literature 1, there is described an electrode catalyst for an air electrode having the following configuration: (1) the electrode catalyst for an air electrode contains first catalyst particles formed of a Pt alloy and second catalyst particles formed of pure Pt having an average particle diameter smaller than that of the first catalyst particles; and (2) the Pt alloy has an atomic composition ratio represented by PtxM ($1 \leq x \leq 4$, M represents a base metal element).

In Patent Literature 2, there is described an electrode catalyst material containing (i) a supporting material containing a plurality of individual supporting particles or aggregates, (ii) first particles containing a first metal and an alloy metal, and (iii) second particles formed of a second metal that is platinum or iridium or an oxide of the second metal, characterized in that the individual supporting particles or aggregates each have the first particles and the second particles dispersed thereon, and the average particle diameter of the second particles is smaller than the average particle diameter of the first particles.

CITATION LIST

Patent Literature

[PTL 1] JP 2018-181739 A
[PTL 2] JP 2019-517110 A

SUMMARY OF INVENTION

Technical Problem

However, it has hitherto been difficult to obtain an electrode catalyst supporting a catalyst metal, such as platinum, which has both excellent catalytic activity and durability.

The present invention has been made in view of the above-mentioned problem, and an object of the present invention is to provide a metal-supported catalyst, a battery electrode, and a battery each having both excellent catalytic activity and durability.

Solution to Problem

In order to achieve the above-mentioned object, according to one embodiment of the present invention, there is provided a metal-supported catalyst, including: a carbon carrier; and platinum particles serving as catalyst metal particles supported on the carbon carrier, wherein the platinum particles contain pure platinum particles and platinum alloy particles, wherein a proportion of a weight of the pure platinum particles to a sum of the weight of the pure platinum particles and a weight of the platinum alloy particles is 15% or more and 61% or less, and wherein a ratio of a proportion of a nitrogen atom content to a carbon atom content measured by elemental analysis using a combustion method, to a proportion of a nitrogen atom content to a carbon atom content measured by X-ray photoelectron spectroscopy, is 1.05 or more. According to the one embodiment of the present invention, the metal-supported catalyst having both excellent catalytic activity and durability is provided.

In the metal-supported catalyst, a volume of pores each having a diameter of 0.5 nm or more and 2.0 nm or less per unit weight of the carbon carrier may be 0.20 ($cm^3$/g-carrier) or more. In the metal-supported catalyst, an average crystallite diameter of the platinum particles calculated by Scherrer equation through use of a diffraction angle and a full width at half maximum of one or more diffraction peaks obtained by separating a diffraction line having a diffraction angle $2\theta$ in a vicinity of 40° in a powder X-ray diffraction pattern by a $CuK\alpha$ ray may be 10.0 nm or less. In the metal-supported catalyst, a proportion of an amount of platinum particles, in which an average crystallite diameter thereof calculated by Scherrer equation through use of a diffraction angle and a full width at half maximum of one or more diffraction peaks obtained by separating a diffraction line having a diffraction angle $2\theta$ in a vicinity of 40° in a powder X-ray diffraction pattern by a $CuK\alpha$ ray is 5.0 nm or less, to a total amount of the platinum particles, may be 65% or more.

In the metal-supported catalyst, a normalized specific surface area, calculated by multiplying a BET specific surface area by a ratio of a weight of the metal-supported catalyst to a weight of the carbon carrier, may be 800 ($m^2$/g-carrier) or more. In the metal-supported catalyst, the platinum alloy particles may each contain a platinum alloy of platinum and a transition metal.

In the metal-supported catalyst, an electrochemical surface area (CO-ECSA), obtained by dividing a carbon monoxide adsorption electric quantity measured in stripping voltammetry using a rotating disc electrode containing the metal-supported catalyst by a theoretical area-equivalent electric quantity of carbon monoxide adsorption to platinum and a weight of platinum supported on the metal-supported catalyst, may be 100.0 $m^2$/g-platinum or less. In the metal-supported catalyst, a ratio of a nitrogen atom concentration to a carbon atom concentration measured by X-ray photoelectron spectroscopy may be 0.010 or more.

The metal-supported catalyst may have a carbon structure that exhibits a full width at half maximum of 160 $cm^{-1}$ or less of a D band having a peak top in a vicinity of 1,360 $cm^{-1}$ in a Raman spectrum obtained by Raman spectroscopy. The metal-supported catalyst may have a carbon structure that exhibits a full width at half maximum of 90 $cm^{-1}$ or less of a G band having a peak top in a vicinity of 1,600 $cm^{-1}$ in a Raman spectrum obtained by Raman spectroscopy. The metal-supported catalyst may have a carbon structure that exhibits a ratio, of a minimum intensity between a G band having a peak top in a vicinity of 1,600 $cm^{-1}$ and a D band having a peak top in a vicinity of 1,360 $cm^{-1}$, to an intensity of the G band, in a Raman spectrum obtained by Raman spectroscopy, of 0.20 or more and 0.50 or less.

The metal-supported catalyst may have a carbon structure that exhibits a nitrogen desorption amount of $1.00 \times 10^{-5}$ (mol/g-carrier) or more from 600° C. to 1,000° C. per unit weight of the carbon carrier in a temperature programmed desorption method. The metal-supported catalyst may have a carbon structure that exhibits a nitrogen desorption amount of $1.00 \times 10^{-5}$ (mol/g-carrier) or more from 800° C. to 1,000° C. per unit weight of the carbon carrier in a temperature programmed desorption method.

In order to achieve the above-mentioned object, according to one embodiment of the present invention, there is provided a battery electrode, including any one of the above-mentioned catalysts. According to the one embodiment of the present invention, the metal-supported catalyst battery electrode having both excellent catalytic activity and durability is provided.

In order to achieve the above-mentioned object, according to one embodiment of the present invention, there is provided a battery, including the battery electrode. According to the one embodiment of the present invention, the metal-supported catalyst battery having both excellent catalytic activity and durability is provided.

Advantageous Effects of Invention

According to the present invention, the metal-supported catalyst, the battery electrode, and the battery each having both excellent catalytic activity and durability are provided.

BRIEF DESCRIPTION OF DRAWINGS

FIG. 2 is an explanatory diagram showing an example of results of peak separation in a powder X-ray diffraction pattern.

FIG. 6A is an explanatory diagram showing an example of evaluation results of the characteristics of metal-supported catalysts in Examples according to one embodiment of the present invention.

FIG. 6B is an explanatory diagram showing another example of evaluation results of the characteristics of the metal-supported catalysts in Examples according to one embodiment of the present invention.

FIG. 6C is an explanatory diagram showing still another example of evaluation results of the characteristics of the metal-supported catalysts in Examples according to one embodiment of the present invention.

DESCRIPTION OF EMBODIMENTS

Figure 1A:
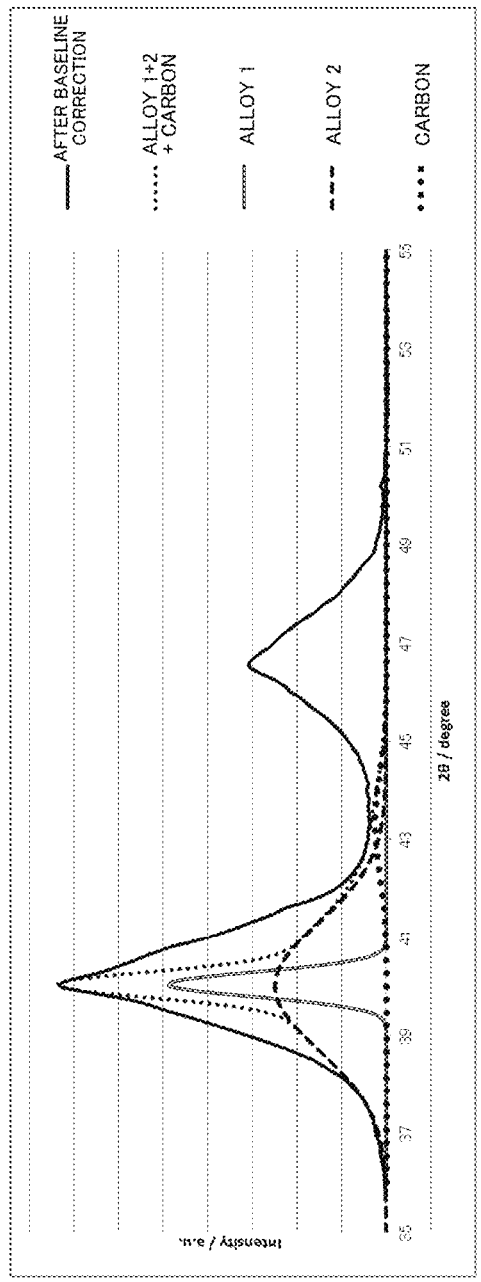
FIG. 1A is an explanatory graph showing an example of peak separation in a powder X-ray diffraction pattern.

Now, a catalyst according to one embodiment of the present invention (hereinafter referred to as "catalyst of the present invention"), a battery electrode according to one embodiment of the present invention (hereinafter referred to as "electrode of the present invention"), and a battery according to one embodiment of the present invention (hereinafter referred to as "battery of the present invention") will be described. The present invention is not limited to examples described in these embodiments.

The catalyst of the present invention is a metal-supported catalyst including: a carbon carrier; and pure platinum particles and platinum alloy particles serving as catalyst metal particles supported on the carbon carrier, wherein a proportion (pure Pt proportion) of a weight of the pure platinum particles to a sum of the weight of the pure platinum particles and a weight of the platinum alloy particles is 15% or more and 61% or less, and wherein a ratio (N-CHN/XPS ratio) of: a ratio (CHN-N/C ratio) of a nitrogen atom content to a carbon atom content measured by elemental analysis using a combustion method (CHN); to a ratio (XPS-N/C ratio) of a nitrogen atom content to a carbon atom content measured by X-ray photoelectron spectroscopy (XPS), is 1.05 or more.

The carbon carrier contained in the catalyst of the present invention is a carbon material mainly formed of carbon. The content of carbon atoms in the carbon carrier may be, for example, 70 wt % or more, 75 wt % or more, 80 wt % or more, or 85 wt % or more.

The carbon carrier may be a carbonized material. That is, the carbon carrier may be a carbonized material obtained by carbonizing a raw material containing an organic substance. In addition, the carbon carrier may be a carbonized material obtained by carbonizing a raw material containing an organic substance and a metal. In this case, the metal is preferably a transition metal. The transition metal may be a transition metal other than platinum, or may be a transition metal other than noble metals (e.g., ruthenium (Ru), palladium (Pd), rhodium (Rh), silver (Ag), osmium (Os), iridium (Ir), platinum (Pt), and gold (Au)).

The carbon carrier may contain a transition metal inside a skeleton thereof. That is, the carbon carrier may contain a transition metal inside a skeleton forming a porous structure thereof. Specifically, when the carbon carrier is a carbonized material produced by carbonizing a raw material containing an organic substance and a transition metal, the carbon carrier contains a transition metal derived from the raw material for carbonization at the time of production thereof. That is, the carbon carrier contains a transition metal inside the skeleton thereof because the transition metal is contained in the raw material for carbonization. Even when the carbon carrier is produced through metal removal treatment, a trace amount of the transition metal derived from the raw material remains inside the carbon carrier.

The transition metal inside the skeleton of the carbon carrier is detected by cutting the skeleton and analyzing cross-sections exposed by the cutting. That is, in the case where the carbon carrier is in the form of particles, when the particles of the carbon carrier are cut, the transition metal is detected in cross-sections of the particles exposed by the cutting.

The transition metal contained in the carbon carrier may be detected by, for example, ICP-MS. The content of the transition metal by ICP-MS of the carbon carrier is calculated as a proportion (wt %) of the weight of transition metal atoms to the total weight of the carbon carrier.

The carbon carrier may contain 0.01 wt % or more of the transition metal (e.g., a transition metal derived from the raw material for carbonization) inside the skeleton thereof, or may contain 0.02 wt % or more of the transition metal. In addition, the content of the transition metal in the carbon carrier may be 15 wt % or less, or may be 10 wt % or less. The content of the transition metal in the carbon carrier may be specified by arbitrarily combining any one of the above-mentioned lower limit values and any one of the above-mentioned upper limit values.

The transition metal contained in the carbon carrier derived from the raw material for carbonization may be a transition metal belonging to Groups III to XII in the periodic table, and is preferably a transition metal belonging to the fourth period of Groups III to XII in the periodic table.

Specifically, the transition metal contained in the carbon carrier may be, for example, one or more kinds or two or more kinds selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), silver (Ag), lanthanoids (e.g., gadolinium (Gd)), and actinoids, and is preferably one or more kinds or two or more kinds selected from the group consisting of Fe, Co, Ni, Cu, and Zn, particularly preferably one or more kinds or two or more kinds selected from the group consisting of Fe, Co, Ni, and Zn.

The carbon carrier may be a carbon catalyst. In this case, the carbon carrier itself exhibits catalytic activity independently. Specifically, the carbon carrier may exhibit, for example, reduction activity and/or oxidation activity as catalytic activity, and preferably exhibits oxygen reduction activity and/or hydrogen oxidation activity, and particularly preferably exhibits at least oxygen reduction activity.

The carbon carrier may be a carbon catalyst containing a transition metal inside a skeleton thereof. That is, when the carbon carrier is a carbon catalyst obtained by carbonizing a raw material containing an organic substance and a metal, the carbon structure of the carbon catalyst contains the metal. In this case, it is conceived that the catalytic activity of the carbon catalyst is mainly caused by active sites contained in the carbon structure formed by the carbonization, rather than the metal derived from the raw material for the carbonization. The foregoing is supported by the following facts: even when a carbon catalyst containing a metal derived from a raw material for carbonization is subjected to metal removal treatment for reducing the content of the metal, the catalytic activity of the carbon catalyst after the metal removal treatment is not significantly reduced compared to the catalytic activity before the metal removal treatment; and a carbon material obtained by supporting a metal on a surface of a carbonized material, which is obtained by carbonizing a raw material that contains an organic substance but does not contain a metal, after the carbonization, does not have excellent catalytic activity, unlike the carbon catalyst.

The catalyst of the present invention contains platinum (Pt) particles as the catalyst metal particles supported on the carbon carrier. The Pt particles contain pure platinum particles (pure Pt particles) and platinum alloy particles (Pt alloy particles). Pure Pt shows a diffraction line having a peak top at a position at which a diffraction angle (2θ) is 39.6° or more and less than 39.8° in an XRD diffraction pattern obtained by X-ray diffraction (XRD). The Pt alloy shows a diffraction line having a peak top at a position at which the diffraction angle (2θ) is 39.9° or more and less than 43.0° in the XRD diffraction pattern.

The Pt alloy is an alloy of Pt and one or more kinds of other metals (metals other than Pt: non-Pt metals). The non-Pt metal is not particularly limited as long as the non-Pt metal forms an alloy with Pt, but is preferably a transition metal. That is, the Pt alloy particles may each contain a platinum alloy of platinum and a transition metal. In this case, the Pt alloy may be an alloy of Pt and one kind of transition metal, or may be an alloy of Pt and two or more kinds of transition metals.

Specifically, the Pt alloy is preferably an alloy of Pt and one or more kinds of transition metals selected from the group consisting of Cu, Mn, Ce, Au, Pd, Ru, Nb, Ti, Fe, Co, and Ni, more preferably an alloy of Pt and one or more kinds of transition metals selected from the group consisting of Fe, Co, and Ni, and particularly preferably an alloy of Pt and one or more kinds of transition metals selected from the group consisting of Co and Ni.

The inclusion of the Pt alloy particles of Pt and a transition metal in the catalyst of the present invention contributes to catalytic activity. When Pt forms an alloy with a base metal, strain occurs in a lattice, and oxygen reduction catalytic activity thereof is improved. The above-mentioned Pt alloy particles each containing a transition metal each exhibit excellent catalytic activity by having a lattice in which appropriate strain occurs.

The content of Pt in the catalyst of the present invention (proportion of the weight of Pt contained in the Pt particles supported on the metal-supported catalyst to the weight of the metal-supported catalyst) obtained by ICP-MS measurement may be, for example, 1.0 wt % or more, and is preferably 5.0 wt % or more, more preferably 10.0 wt % or more, and particularly preferably 20.0 wt % or more. The content of Pt in the catalyst of the present invention obtained by ICP-MS measurement may be, for example, 60.0 wt % or less.

The molar ratio of Pt to the non-Pt metal contained in the catalyst of the present invention (Pt/non-Pt metal ratio) obtained by ICP-MS measurement may be, for example, 0.5 or more, and is preferably 1.0 or more, particularly preferably 2.0 or more. The Pt/non-Pt metal ratio may be, for example, 10.0 or less, and is preferably 20.0 or less, particularly preferably 15.0 or less. The Pt/non-Pt metal ratio may be specified by arbitrarily combining any one of the above-mentioned lower limit values and any one of the above-mentioned upper limit values.

The catalyst of the present invention contains the pure Pt particles and the Pt alloy particles in such a ratio that the pure Pt proportion falls within a range of 15% or more and 61% or less. The pure Pt proportion of the catalyst of the present invention is, for example, preferably 20% or more and 60% or less, more preferably 25% or more and 60% or less, and particularly preferably 30% or more and 55% or less.

The pure Pt proportion of the catalyst of the present invention falling within the above-mentioned specific ranges contributes to excellent catalytic activity and durability of the catalyst of the present invention. The pure Pt particles have excellent durability, but the catalytic activity thereof is not necessarily sufficient. Meanwhile, the Pt alloy particles have excellent catalytic activity, but the durability thereof is not necessarily sufficient. The catalyst of the present invention contains, as the catalyst metal particles, the pure Pt particles and the Pt alloy particles in such a specific ratio that the pure Pt proportion falls within the above-mentioned specific ranges. As a result, the synergistic effect is exhibited, and excellent catalytic activity and excellent durability, which are better than those obtained by simply combining the catalytic activity and the durability of both the pure Pt particles and the Pt alloy particles, are achieved.

The supporting of the Pt alloy (e.g., an alloy of Pt and a transition metal) particles by the catalyst of the present invention contributes to the catalytic activity. When Pt forms an alloy with a base metal, strain occurs in a lattice, and oxygen reduction catalytic activity thereof is improved. Because of this, when the catalyst of the present invention contains platinum alloy particles each having a lattice in which appropriate strain occurs, excellent catalytic activity is obtained.

In addition, the catalyst of the present invention contains nitrogen atoms in such a distribution that an N-CHN/XPS ratio is 1.10 or more. The N-CHN/XPS ratio of the catalyst of the present invention is, for example, preferably 1.20 or more. The N-CHN/XPS ratio of the catalyst of the present invention may be, for example, 2.00 or less.

The high N-CHN/XPS ratio of the catalyst of the present invention contributes to the durability of the catalyst of the present invention. A nitrogen content by XPS indicates the content of nitrogen that is present on the surface of the carbon carrier and within a range of a depth of several nanometers from the surface. Meanwhile, a nitrogen content by elemental analysis using the combustion method indicates the content of nitrogen that is present in the entirety including the surface and the inner portion of the carbon carrier.

Accordingly, the high N-CHN/XPS ratio of the catalyst of the present invention indicates that a larger amount of nitrogen atoms are present inside the carbon carrier, than on the surface of the carbon carrier. The nitrogen atoms bind to a metal. Because of this, when a larger amount of the nitrogen atoms are present inside the carbon carrier, a larger amount of the catalyst metal particles are supported inside the carbon carrier, and the elution of the catalyst metal is suppressed. As a result, the durability of the catalyst of the present invention is improved.

The catalyst of the present invention contains pores. Specifically, the catalyst of the present invention contains pores in the carbon carrier thereof. The volume ($cm^3/g$) of the pores per unit weight of the catalyst of the present invention is obtained by a BJH method from a nitrogen adsorption isotherm obtained through use of a BET method. In addition, the volume ($cm^3$/g-carrier) of the pores per unit weight of the carbon carrier in the catalyst of the present invention is calculated by dividing the volume ($cm^3/g$) of the pores per unit weight of the catalyst of the present invention by the weight ratio of the carbon carrier contained in the catalyst of the present invention calculated by the following equation: weight ratio of carbon carrier=1−(metal content (wt %) obtained by ICP-MS)/100.

The catalyst of the present invention contains pores (first pores) each having a diameter of 0.5 nm or more and 2.0 nm or less. The first pores are relatively small pores among the pores of the carbon carrier contained in the catalyst of the present invention. The first pores are expected to function as a place for nucleation and particle growth of catalyst metal particles each having a relatively small particle diameter and exhibiting high catalytic activity.

The volume of the first pores per unit weight of the catalyst of the present invention may be, for example, 0.10 ($cm^3/g$) or more, and is preferably 0.13 ($cm^3/g$) or more, more preferably 0.16 ($cm^3/g$) or more, and particularly preferably 0.20 ($cm^3/g$) or more.

The volume of the first pores per unit weight of the catalyst of the present invention may be, for example, 3.00 ($cm^3/g$) or less, 2.50 ($cm^3/g$) or less, 2.00 ($cm^3/g$) or less, 1.50 ($cm^3/g$) or less, or 1.00 ($cm^3/g$) or less. The volume of the first pores per unit weight of the catalyst of the present invention may be specified by arbitrarily combining any one of the above-mentioned lower limit values and any one of the above-mentioned upper limit values.

The volume of the first pores per unit weight of the carbon carrier of the catalyst of the present invention may be 0.20 ($cm^3$/g-carrier) or more. In this case, the volume of the first pores of the catalyst of the present invention is, for example, preferably 0.25 ($cm^3$/g-carrier) or more, more preferably 0.30 ($cm^3$/g-carrier) or more, still more preferably 0.35 ($cm^3$/g-carrier) or more, and particularly preferably 0.40 ($cm^3$/g-carrier) or more.

The volume of the first pores per unit weight of the carbon carrier may be, for example, 3.00 ($cm^3$/g-carrier) or less, 2.00 ($cm^3$/g-carrier) or less, or 1.00 ($cm^3$/g-carrier) or less. The volume of the first pores per unit weight of the carbon carrier may be specified by arbitrarily combining any one of the above-mentioned lower limit values and any one of the above-mentioned upper limit values.

The large volume of the first pores contributes to the catalytic activity of the catalyst of the present invention. That is, for example, when the catalyst of the present invention is used as an oxygen reduction catalyst, the large volume of the first pores provides a place where catalyst metal particles each exhibiting high catalytic activity and having a relatively small particle diameter are preferentially generated, and as a result, contributes to the excellent oxygen reduction catalytic activity of the catalyst of the present invention.

The catalyst of the present invention may contain pores (second pores) each having a diameter of more than 2.0 nm and 4.0 nm or less. The second pores are pores that are relatively small but are larger than the first pores. The second pores are expected to function as a place for transport of a reactant and a product of a chemical reaction by the catalyst of the present invention.

The volume of the second pores per unit weight of the catalyst of the present invention may be, for example, 0.10 ($cm^3/g$) or more, and is preferably 0.15 ($cm^3/g$) or more, more preferably 0.20 ($cm^3/g$) or more, still more preferably 0.25 ($cm^3/g$) or more, and particularly preferably 0.25 ($cm^3/g$) or more.

The volume of the second pores per unit weight of the catalyst of the present invention may be, for example, 3.00 ($cm^3/g$) or less, 2.00 ($cm^3/g$) or less, or 1.00 ($cm^3/g$) or less. The volume of the second pores per unit weight of the carbon carrier may be specified by arbitrarily combining any one of the above-mentioned lower limit values and any one of the above-mentioned upper limit values.

The volume of the second pores per unit weight of the carbon carrier of the catalyst of the present invention is 0.20 ($cm^3$/g-carrier) or more. The volume of the second pores per unit weight of the carbon carrier is preferably 0.25 ($cm^3$/g-carrier) or more, particularly preferably 0.30 ($cm^3$/g-carrier) or more.

The volume of the second pores per unit weight of the carbon carrier may be, for example, 3.00 ($cm^3$/g-carrier) or less, 2.00 ($cm^3$/g-carrier) or less, or 1.00 ($cm^3$/g-carrier) or less. The volume of the second pores per unit weight of the carbon carrier may be specified by arbitrarily combining any one of the above-mentioned lower limit values and any one of the above-mentioned upper limit values.

The large volume of the second pores contributes to the durability of the catalyst of the present invention. That is, for example, when the catalyst of the present invention is used as an oxygen reduction catalyst for a fuel cell electrode, the second pores are expected to accelerate the drainage of generated water. Accordingly, when the volume of the second pores is large, the retention of the generated water in the carbon carrier of the catalyst of the present invention and the accompanying oxidative corrosion of carbon are effectively suppressed, and the aggregation and desorption of the catalyst metal particles are suppressed. Further, the second pores are expected to support the catalyst metal particles relatively firmly, and hence the large volume of the second pores effectively suppresses the aggregation and desorption of the catalyst metal particles from the carbon carrier of the catalyst of the present invention.

The catalyst of the present invention may contain pores (third pores) each having a diameter of more than 4.0 nm and 50.0 nm or less. The third pores are pores that are larger than the second pores. The third pores provide a place where catalyst metal particles each having a relatively large particle diameter are supported.

The volume of the third pores per unit weight of the catalyst of the present invention may be, for example, 0.10 ($cm^3/g$) or more, and is preferably 0.15 ($cm^3/g$) or more, particularly preferably 0.20 ($cm^3/g$) or more.

The volume of the third pores per unit weight of the catalyst of the present invention may be, for example, 3.00 ($cm^3/g$) or less, and is preferably 1.50 ($cm^3/g$) or less, particularly preferably 0.85 ($cm^3/g$) or less. The volume of the third pores per unit weight of the catalyst of the present invention may be specified by arbitrarily combining any one of the above-mentioned lower limit values and any one of the above-mentioned upper limit values.

The volume of the third pores per unit weight of the carbon carrier of the catalyst of the present invention may be, for example, 0.20 ($cm^3$/g-carrier) or more, and is preferably 0.25 ($cm^3$/g-carrier) or more, particularly preferably 0.30 ($cm^3$/g-carrier) or more.

The volume of the third pores per unit weight of the carbon carrier of the catalyst of the present invention may be, for example, 3.00 ($cm^3$/g-carrier) or less, and is preferably 1.50 ($cm^3$/g-carrier) or less, particularly preferably 0.90 ($cm^3$/g-carrier) or less. The volume of the third pores per unit weight of the carbon carrier may be specified by arbitrarily combining any one of the above-mentioned lower limit values and any one of the above-mentioned upper limit values.

The ratio of the volume of the third pores to the volume of the second pores (third pore/second pore volume ratio) per unit weight of the catalyst of the present invention may be, for example, 3.00 or less, and is preferably 2.50 or less, particularly preferably 2.00 or less.

The third pore/second pore volume ratio per unit weight of the catalyst of the present invention may be, for example, 0.1 or more, or 0.5 or more. The third pore/second pore volume ratio per unit weight of the catalyst of the present invention may be specified by arbitrarily combining any one of the above-mentioned lower limit values and any one of the above-mentioned upper limit values.

The ratio of the volume of the third pores to the volume of the second pores (third pore/second pore volume ratio) per unit weight of the carbon carrier of the catalyst of the present invention may be, for example, 3.00 or less. The third pore/second pore volume ratio per unit weight of the carbon carrier of the catalyst of the present invention is, for example, preferably 2.50 or less, particularly preferably 2.00 or less. The third pore/second pore volume ratio may be, for example, 0.1 or more, or 0.5 or more. The third pore/second pore volume ratio of the catalyst of the present invention may be specified by arbitrarily combining any one of the above-mentioned lower limit values and any one of the above-mentioned upper limit values.

When the third pore/second pore volume ratio is not too large, an excessive increase in proportion of the catalyst metal particles each having a large particle diameter is effectively suppressed.

In the catalyst of the present invention, an average crystallite diameter of the Pt particles calculated by Scherrer equation through use of a diffraction angle and a full width at half maximum of one or more diffraction peaks (e.g., a diffraction peak of the carbon carrier, a diffraction peak of pure noble metal particles, and one or more diffraction peaks of noble metal alloy particles) obtained by separating a diffraction line having a diffraction angle 2θ in the vicinity of 40° in a powder X-ray diffraction pattern by a CuKα ray, may be 10.0 nm or less.

The average crystallite diameter of the Pt particles is, for example, preferably 8.0 nm or less, more preferably 7.5 nm or less, still more preferably 7.0 nm or less, and particularly preferably 6.0 nm or less. The average crystallite diameter of the Pt particles may be, for example, 1.0 nm or more.

The small average crystallite diameter of the Pt particles of the catalyst of the present invention contributes to excellent catalytic activity. That is, when the average crystallite diameter of the Pt particles is small, a roughness factor is increased, and a substance transport resistance is decreased. For example, when the catalyst of the present invention is used as an oxygen reduction catalyst for a fuel cell electrode, the oxygen transport resistance is reduced. As a result, a voltage loss is reduced, and a larger maximum output is obtained.

In the catalyst of the present invention, the proportion of the amount of platinum particles, in which an average crystallite diameter thereof calculated by Scherrer equation through use of a diffraction angle and a full width at half maximum of one or more diffraction peaks obtained by separating a diffraction line having a diffraction angle 2θ in the vicinity of 40° in a powder X-ray diffraction pattern by a CuKα ray, is 5.0 nm or less, to the total amount of the platinum particles, may be 65% or more. The proportion of the platinum particles having an average crystallite diameter of 5.0 nm or less is, for example, preferably 70% or more, more preferably 75% or more, and particularly preferably 80% or more.

Of the platinum particles of the catalyst of the present invention, the large proportion of the platinum particles having an average crystallite diameter of 5.0 nm or less contributes to excellent catalytic activity. The platinum particles having an average crystallite diameter of 5.0 nm or less have a large roughness factor, and hence the substance transport resistance is reduced. For example, when the catalyst of the present invention is used as an oxygen reduction catalyst for a fuel cell, the oxygen transport resistance is reduced. As a result, a voltage loss is reduced, and a larger maximum output is obtained.

The average particle diameter of the catalyst of the present invention may be, for example, 1.00 μm or less, and is preferably 0.80 μm or less, more preferably 0.60 μm or less, still more preferably 0.40 μm or less, and particularly preferably 0.30 μm or less. The average particle diameter of the catalyst of the present invention may be, for example, 0.010 μm or more.

The average particle diameter of the catalyst of the present invention equal to or less than the above-mentioned specific threshold value contributes to an increase in efficiency of a chemical reaction by the catalyst of the present invention, contributes to the excellent catalytic activity of the catalyst of the present invention, and also contributes to an increase in efficiency in production of a battery electrode containing the catalyst of the present invention.

The proportion of the number of Pt particles in an STEM secondary electron image of the metal-supported catalyst to the number of Pt particles in an HAADF-STEM image of the metal-supported catalyst (secondary electron image/HAADF image proportion (%)) may be, for example, 12% or less, and is preferably 11% or less, particularly preferably 10% or less.

The secondary electron image/HAADF image proportion (%) equal to or less than the above-mentioned specific threshold value contributes to the catalytic activity of the catalyst of the present invention. That is, for example, in the case where the catalyst of the present invention is used as an oxygen reduction catalyst for a fuel cell electrode, the proportion of the catalyst metal that is present on the outermost surface of the carbon carrier is reduced when the secondary electron image/HAADF image proportion (%) is equal to or less than the above-mentioned specific threshold value, and hence the poisoning of the catalyst metal by an electrolyte or the like is suppressed.

The BET specific surface area of the catalyst of the present invention may be, for example, 500 m$^2$/g or more, and is preferably 600 m$^2$/g or more, more preferably 700 m$^2$/g or more, and particularly preferably 800 m$^2$/g or more.

The BET specific surface area of the catalyst of the present invention may be, for example, 3,000 (m$^2$/g) or less, or 2,500 (m$^2$/g) or less. The BET specific surface area of the catalyst of the present invention may be specified by arbitrarily combining any one of the above-mentioned lower limit values and any one of the above-mentioned upper limit values.

The normalized specific surface area calculated by multiplying the BET specific surface area of the catalyst of the present invention by the ratio of the weight of the metal-supported catalyst to the weight of the carbon carrier may be 800 (m$^2$/g-carrier) or more.

The normalized specific surface area of the catalyst of the present invention is, for example, preferably 1,000 (m$^2$/g-carrier) or more, more preferably 1,100 (m$^2$/g-carrier) or more, still more preferably 1,200 (m$^2$/g-carrier) or more, and particularly preferably 1,300 (m$^2$/g-carrier) or more.

The normalized specific surface area of the catalyst of the present invention may be, for example, 3,000 (m$^2$/g-carrier) or less, or 2,500 (m$^2$/g-carrier) or less. The normalized specific surface area of the catalyst of the present invention may be specified by arbitrarily combining any one of the above-mentioned lower limit values and any one of the above-mentioned upper limit values.

The large specific surface area (BET specific surface area and/or normalized specific surface area, particularly normalized specific surface area) of the catalyst of the present invention contributes to the catalytic activity thereof. When the specific surface area is increased, the catalyst metal particles are likely to be more uniformly supported in the pores on an inner side of the carbon carrier. Because of this, for example, when the catalyst of the present invention having a large specific surface area is used as an electrode catalyst for a fuel cell, the aggregation of the catalyst metal particles and the coating of the catalyst metal particles with an electrolyte are effectively suppressed. The catalyst metal particles are efficiently utilized when the coating with an electrolyte is suppressed.

In the catalyst of the present invention, the ratio (XPS-N/C ratio) of the nitrogen atom concentration (atom %) to the carbon atom concentration (atom %) measured by XPS may be, for example, 0.010 or more. The XPS-N/C ratio of the catalyst of the present invention is, for example, preferably 0.012 or more, particularly preferably 0.015 or more. The XPS-N/C ratio of the catalyst of the present invention may be, for example, 0.15 or less. In addition, the ratio of the nitrogen atom content (wt %) to the carbon atom content (wt %) (XPS-N/C weight ratio) is determined from the atomic weight ratio of the carbon atoms and the nitrogen atoms.

In the catalyst of the present invention, the ratio (CHN-N/C ratio) of the nitrogen atom content (wt %) to the carbon atom content (wt %) measured by elemental analysis using a combustion method (CHN) may be 0.010 or more, and is preferably 0.015 or more, particularly preferably 0.020 or more. The CHN-N/C ratio of the catalyst of the present invention may be, for example, 0.20 or less.

The N/C ratio of the catalyst of the present invention equal to or more than the above-mentioned specific threshold value reflects that the surface of the carbon structure (more specifically, the carbon structure of the carbon carrier) of the catalyst of the present invention contains a large amount of non-catalyst metal active sites (active sites of the carbon carrier itself other than the catalyst metal active sites supported on the carbon carrier), such as a nitrogen-containing functional group, specific type nitrogen atoms such as pyridine type nitrogen, pyrrole type nitrogen, and graphite type nitrogen introduced into the inside of a carbon network plane, and a carbon curved structure formed of the foregoing, and contributes to the excellent catalytic activity of the catalyst of the present invention.

In addition, the N/C ratio of the catalyst of the present invention equal to or more than the above-mentioned specific threshold value means that the carbon carrier of the catalyst of the present invention contains a rich Pt-supported site.

The catalyst of the present invention may have a carbon structure that exhibits a full width at half maximum of 160 cm$^{-1}$ or less of a D band having a peak top in the vicinity of 1,360 cm$^{-1}$ (e.g., in a range of 1,250 cm$^{-1}$ or more and 1,450 cm$^{-1}$ or less) in a Raman spectrum obtained by Raman spectroscopy.

That is, in this case, in the Raman spectrum obtained by Raman spectroscopy of the catalyst of the present invention, a D band having a full width at half maximum of 160 cm$^{-1}$ or less, which has a peak top in the vicinity of 1,360 cm$^{-1}$ (e.g., 1,250 cm$^{-1}$ or more and 1,450 cm$^{-1}$ or less), is detected.

In addition, in this case, it is preferred that the N/C ratio measured by XPS of the catalyst of the present invention be equal to or more than the above-mentioned lower limit value, and/or that the N/C ratio measured by elemental analysis using the combustion method of the catalyst of the present invention be equal to or more than the above-mentioned lower limit value.

The full width at half maximum of the D band of the catalyst of the present invention is, for example, preferably 155 cm$^{-1}$ or less, particularly preferably 150 cm$^{-1}$ or less. The full width at half maximum of the D band of the catalyst of the present invention may be, for example, 80 cm$^{-1}$ or more.

The full width at half maximum of the D band is calculated by the following equation: D band full width at half maximum (cm$^{-1}$)=(A$_d$−B$_d$)×2 (in this equation, A$_d$ represents a Raman shift (cm$^{-1}$) corresponding to a D band intensity I$_d$ (peak top of the D band), and B$_d$ represents a Raman shift (cm$^{-1}$) corresponding to a Raman spectrum that exhibits an intensity of half of the D band intensity I$_d$ on a lower wavenumber side from the A$_d$.

In the Raman spectrum, the full width at half maximum of the D band indicates the crystallinity of the curved structure contained in the carbon structure. That is, the small full width at half maximum of the D band means that the crystallinity of the curved structure is high. Because of this, the full width at half maximum of the D band of the carbon structure (specifically, the carbon structure of the carbon carrier) of the catalyst of the present invention equal to or less than the above-mentioned specific threshold value means that the carbon structure contains a highly crystalline curved structure. The catalyst of the present invention having a carbon structure containing a highly crystalline curved structure contributes to the excellent durability and oxidation resistance of the catalyst of the present invention.

The catalyst of the present invention may have a carbon structure that exhibits a full width at half maximum of 90 cm$^{-1}$ or less of a G band having a peak top in the vicinity of 1,600 cm$^1$ in a Raman spectrum obtained by Raman spectroscopy.

That is, in this case, in the Raman spectrum obtained by Raman spectroscopy of the catalyst of the present invention, a G band having a full width at half maximum of 90 cm$^{-1}$ or less, which has a peak top in the vicinity of 1,600 cm$^{-1}$ (e.g., 1,550 cm$^1$ or more and 1,700 cm$^1$ or less), is detected.

In addition, in this case, it is preferred that the N/C ratio measured by XPS of the catalyst of the present invention be equal to or more than the above-mentioned lower limit value, and/or that the N/C ratio measured by elemental analysis using the combustion method of the catalyst of the present invention be equal to or more than the above-mentioned lower limit value.

The full width at half maximum of the G band of the catalyst of the present invention is, for example, preferably 85 cm$^{-1}$ or less, particularly preferably 80 cm$^{-1}$ or less. The full width at half maximum of the G band of the catalyst of the present invention may be, for example, 40 cm$^{-1}$ or more.

The full width at half maximum of the G band is calculated by the following equation: G band full width at half maximum (cm$^{-1}$)={absolute value of $(A_g-B_g)$}×2 (in this equation, $A_g$ represents a Raman shift (cm$^{-1}$) corresponding to a G band intensity $I_g$ (peak top of the G band), and $B_g$ represents a Raman shift (cm$^{-1}$) corresponding to a Raman spectrum that exhibits an intensity of half of the G band intensity $I_g$ on a higher wavenumber side from the $A_g$).

In the Raman spectrum, the full width at half maximum of the G band indicates the crystallinity of the graphite structure contained in the carbon structure. That is, the small full width at half maximum of the G band means that the crystallinity of the graphite structure is high. Because of this, the full width at half maximum of the G band of the carbon structure (specifically, the carbon structure of the carbon carrier) of the catalyst of the present invention equal to or less than the above-mentioned specific threshold value means that the carbon structure contains a highly crystalline graphite structure. The catalyst of the present invention having a carbon structure containing a highly crystalline graphite structure contributes to the excellent durability and oxidation resistance of the catalyst of the present invention.

The catalyst of the present invention may have a carbon structure that exhibits a ratio ($I_v/I_g$ ratio) of a minimum intensity between a G band having a peak top in the vicinity of 1,600 cm$^{-1}$ and a D band having a peak top in the vicinity of 1,360 cm$^{-1}$, to an intensity of the G band in a Raman spectrum obtained by Raman spectroscopy, of 0.20 or more and 0.50 or less.

That is, in this case, in the Raman spectrum obtained by Raman spectroscopy of the catalyst of the present invention, a D band having a peak top in the vicinity of 1,360 cm$^{-1}$ is detected, a G band having a peak top in the vicinity of 1,600 cm$^{-1}$ is detected, and the ratio of the minimum intensity between the G band and the D band, to the intensity of the G band, is 0.20 or more and 0.50 or less.

In addition, in this case, it is preferred that the N/C ratio measured by XPS of the catalyst of the present invention be equal to or more than the above-mentioned lower limit value, and/or that the N/C ratio measured by elemental analysis using the combustion method of the catalyst of the present invention be equal to or more than the above-mentioned lower limit value.

The $I_v/I_g$ ratio of the catalyst of the present invention is, for example, preferably 0.20 or more and 0.45 or less, more preferably 0.25 or more and 0.45 or less, and particularly preferably 0.25 or more and 0.40 or less.

In the Raman spectrum, the G band is a component derived from an ideal graphite structure, and the D band is a component derived from a curved structure including defects and edges. The minimum intensity $I_v$ between the G band and the D band depends on components derived from an amorphous substance. Accordingly, the $I_v/I_g$ ratio is a ratio of the amount of the amorphous substance to the amount of an ideal graphite structure. In the carbon structure, active sites are present in the amorphous substance. However, when the amount of the amorphous substance is too large, the carbon carrier (e.g., the carbon carrier that is a carbon catalyst) is liable to be deteriorated, and hence it is conceived that there is an optimum range in the $I_v/I_g$ ratio. In this respect, the $I_v/I_g$ ratio of the carbon structure (specifically, the carbon structure of the carbon carrier) of the catalyst of the present invention falling within the above-mentioned specific range means that the carbon carrier has excellent catalyst active sites (non-catalyst metal active sites) other than the catalyst metal in the catalyst of the present invention.

The catalyst of the present invention may have a carbon structure that exhibits a nitrogen desorption amount of $1.00 \times 10^{-5}$ (mol/g) or more from 600° C. to 1,000° C. per unit weight of the catalyst of the present invention in a temperature programmed desorption method (TPD).

In addition, in this case, it is preferred that the N/C ratio measured by XPS of the catalyst of the present invention be equal to or more than the above-mentioned lower limit value, and/or that the N/C ratio measured by elemental analysis using the combustion method of the catalyst of the present invention be equal to or more than the above-mentioned lower limit value.

In the TPD of the catalyst of the present invention, the nitrogen desorption amount from 600° C. to 1,000° C. per unit weight of the catalyst of the present invention is, for example, preferably $2.00 \times 10^{-5}$ (mol/g) or more, more preferably $5.00 \times 10^{-5}$ (mol/g) or more, still more preferably $1.00 \times 10^{-4}$ (mol/g) or more, and particularly preferably $5.00 \times 10^{-4}$ (mol/g) or more.

The catalyst of the present invention may have a carbon structure that exhibits a nitrogen desorption amount of $1.00 \times 10^{-3}$ (mol/g) or more from 800° C. to 1,000° C. per unit weight of the catalyst of the present invention in the TPD.

In addition, in this case, it is preferred that the N/C ratio measured by XPS of the catalyst of the present invention be equal to or more than the above-mentioned lower limit value, and/or that the N/C ratio measured by elemental analysis using the combustion method of the catalyst of the present invention be equal to or more than the above-mentioned lower limit value.

In the TPD of the catalyst of the present invention, the nitrogen desorption amount from 800° C. to 1,000° C. per unit weight of the catalyst of the present invention is, for example, preferably $1.50 \times 10^{-5}$ (mol/g) or more, particularly preferably $2.00 \times 10^{-5}$ (mol/g) or more.

The catalyst of the present invention may have a carbon structure that exhibits a nitrogen desorption amount of $1.00 \times 10^{-5}$ (mol/g-carrier) or more from 600° C. to 1,000° C. per unit weight of the carbon carrier in the TPD.

In addition, in this case, it is preferred that the N/C ratio measured by XPS of the catalyst of the present invention be equal to or more than the above-mentioned lower limit value, and/or that the N/C ratio measured by elemental analysis using the combustion method of the catalyst of the present invention be equal to or more than the above-mentioned lower limit value.

In the TPD of the catalyst of the present invention, the nitrogen desorption amount from 600° C. to 1,000° C. per unit weight of the carbon carrier is, for example, preferably $2.00 \times 10^{-5}$ (mol/g-carrier) or more, more preferably $5.00 \times 10^{-5}$ (mol/g-carrier) or more, and particularly preferably $1.00 \times 10^{-4}$ (mol/g-carrier) or more.

The catalyst of the present invention may have a carbon structure that exhibits a nitrogen desorption amount of $1.00 \times 10^{-5}$ (mol/g-carrier) or more from 800° C. to 1,000° C. per unit weight of the carbon carrier in the TPD.

In addition, in this case, it is preferred that the N/C ratio measured by XPS of the catalyst of the present invention be equal to or more than the above-mentioned lower limit value, and/or that the N/C ratio measured by elemental analysis using the combustion method of the catalyst of the present invention be equal to or more than the above-mentioned lower limit value.

In the TPD of the catalyst of the present invention, the nitrogen desorption amount from 800° C. to 1,000° C. per unit weight of the carbon carrier is, for example, preferably $2.00 \times 10^{-5}$ (mol/g-carrier) or more, more preferably $5.00 \times 10^{-5}$ (mol/g-carrier) or more, and particularly preferably $1.00 \times 10^{-4}$ (mol/g-carrier) or more.

The nitrogen desorption amount in the TPD, which is defined as one of the characteristics of the catalyst of the present invention, reflects the quality and amount of nitrogen atoms contained in the carbon structure (specifically, the carbon structure of the carbon carrier) of the catalyst of the present invention. That is, the catalyst of the present invention exhibits excellent durability by having a carbon structure containing nitrogen atoms in a specific quality and amount such that the nitrogen desorption amount in the above-mentioned relatively high specific temperature range exhibits the above-mentioned specific threshold value or less in the above-mentioned TPD.

The following features mean that the carbon carrier of the catalyst of the present invention has active sites (non-catalyst metal active sites) other than the catalyst metal and has excellent oxidation resistance: the N/C ratio of the catalyst of the present invention (specifically, the N/C ratio of the carbon carrier) (the N/C ratio measured by XPS or the N/C ratio measured by elemental analysis using the combustion method) has the above-mentioned specific lower limit value or more; in the Raman spectrum obtained by Raman spectroscopy of the catalyst of the present invention, the full width at half maximum of the D band has the above-mentioned specific upper limit value or less, the full width at half maximum of the G band has the above-mentioned specific upper limit value or less, or the $I_v/I_g$ ratio falls within the above-mentioned specific range; and, in the TPD of the catalyst of the present invention, the nitrogen desorption amount from 600° C. to 1,000° C. has the above-mentioned specific lower limit value or more, or the nitrogen desorption amount from 800° C. to 1,000° C. has the above-mentioned specific lower limit value or more.

In the case where the carbon carrier (e.g., the carbon carrier that is a carbon catalyst) has non-catalyst metal active sites, for example, when the catalyst of the present invention is used as an oxygen reduction catalyst for a fuel cell electrode, the concentration of oxygen onto the catalyst metal during high load operation is alleviated, and a decrease in voltage in a high current density region is suppressed. In addition, in the case where the carbon carrier has excellent oxidation resistance, oxidative wear of the carbon carrier when a high potential is applied due to a load fluctuation during operation, start-stop, and the like is suppressed. As a result, the desorption and aggregation of the catalyst metal (e.g., Pt) are alleviated, and excellent durability is obtained.

In the catalyst of the present invention, an electrochemical surface area (effective platinum catalyst surface area: CO-ECSA determined from a carbon monoxide adsorption electric quantity obtained by stripping voltammetry) obtained by dividing a carbon monoxide adsorption electric quantity measured in stripping voltammetry using a rotating disc electrode containing the catalyst of the present invention, by a theoretical area-equivalent electric quantity of carbon monoxide adsorption to platinum and the weight of platinum supported on the catalyst of the present invention, may be 100.0 m$^2$/g-platinum or less.

The CO-ECSA of the catalyst of the present invention being equal to or less than 100.0 m$^2$/g-platinum contributes to durability. When the CO-ECSA is small, the elution of the catalyst metal is suppressed, and durability is improved.

The platinum equivalent of the non-catalyst metal active sites in the carbon carrier of the catalyst of the present invention may be, for example, 0.5 (mg-Pt/g-carrier) or more, and is preferably 1.0 (mg-Pt/g-carrier) or more, more preferably 5.0 (mg-Pt/g-carrier) or more, still more preferably 10.0 (mg-Pt/g-carrier) or more, and particularly preferably 20.0 (mg-Pt/g-carrier) or more.

The large number of non-catalyst metal active sites of the catalyst of the present invention contributes to the excellent catalytic activity. For example, when the active sites of the catalyst of the present invention used as an oxygen reduction catalyst for a fuel cell electrode are only the catalyst metal particles, oxygen is excessively concentrated on the catalyst metal particles, and the catalytic activity of the catalyst of the present invention is decreased. When the catalyst of the present invention has non-catalyst metal active sites (specifically, the carbon carrier itself has active sites), excessive concentration of oxygen on the catalyst metal particles can be suppressed, and the catalytic activity of the catalyst of the present invention is improved.

The catalyst of the present invention is produced by causing the carbon carrier to support pure Pt particles and Pt alloy particles. A method of producing the catalyst of the present invention includes impregnating the carbon carrier with Pt and a non-Pt metal (e.g., a transition metal) that forms an alloy with the Pt and heating the carbon carrier impregnated with the Pt and the non-Pt metal through use of an electromagnetic wave to form pure Pt particles and Pt alloy particles supported on the carbon carrier.

The electromagnetic wave to be used for heating the carbon carrier is not particularly limited as long as the electromagnetic wave causes the carbon carrier itself, and/or Pt itself and/or the non-Pt metal itself impregnated into the carbon carrier, to generate heat, and for example, a millimeter wave (Extra High Frequency) is preferably used. The millimeter wave is an electromagnetic wave having a wavelength of 1 mm or more and 15 mm or less.

Impregnation of the non-Pt metal and Pt into the carbon carrier is performed by, for example, immersing the carbon carrier in each of a solution containing Pt and a solution containing the non-Pt metal. In this case, for example, it is preferred that the carbon carrier be first impregnated with the non-Pt metal (e.g., a transition metal), and that the carbon carrier impregnated with the non-Pt metal then be impregnated with Pt.

More specifically, the carbon carrier is first impregnated with a solution containing the non-Pt metal. Then, the carbon carrier impregnated with the non-Pt metal is dried, and further, the carbon carrier impregnated with the non-Pt metal and dried is impregnated with a solution containing Pt. After that, the carbon carrier impregnated with the non-Pt metal and Pt is dried.

A method of heating a carbon carrier impregnated with the non-Pt metal and Pt through use of an electromagnetic wave (e.g., a millimeter wave) is not particularly limited as long as the method involves irradiating the carbon carrier with the electromagnetic wave, to thereby cause the carbon carrier itself, and/or the non-Pt metal itself and/or Pt itself to generate heat.

The temperature increase rate in heating of the carbon carrier through use of an electromagnetic wave (e.g., a millimeter wave) may be, for example, 10° C./min or more, and is preferably 50° C./min or more, more preferably 100° C./min or more, and particularly preferably 200° C./min or more. The temperature increase rate in heating of the carbon carrier through use of a millimeter wave may be, for example, 1,000° C./min or less.

In heating of the carbon carrier through use of an electromagnetic wave (e.g., a millimeter wave), the carbon carrier may be heated to a temperature of 200° C. or more, and is heated to preferably a temperature of 300° C. or more, more preferably a temperature of 500° C. or more, and particularly preferably a temperature of 700° C. or more.

In heating of the carbon carrier through use of an electromagnetic wave (e.g., a millimeter wave), the carbon carrier may be heated to a temperature of 1,500° C. or less, and is heated to preferably a temperature of 1,200° C. or less, particularly preferably a temperature of 1,000° C. or less. The temperature for heating the carbon carrier through use of an electromagnetic wave may be specified by arbitrarily combining any one of the above-mentioned lower limit values and any one of the above-mentioned upper limit values.

In heating of the carbon carrier through use of an electromagnetic wave (e.g., a millimeter wave), the carbon carrier may be kept at the above-mentioned heating temperature for 1 second or more, and is preferably kept for 10 minutes or more. In the heating of the carbon carrier through use of an electromagnetic wave, the time for keeping the carbon carrier at the above-mentioned heating temperature may be, for example, 24 hours or less.

The heating of the carbon carrier through use of an electromagnetic wave (e.g., a millimeter wave) is preferably performed in a reducing atmosphere, and is preferably performed in a hydrogen atmosphere.

The carbon carrier is produced by, for example, carbonizing a raw material containing an organic substance. Herein, the case in which a carbon carrier that is a carbon catalyst is produced by a method including carbonizing a raw material containing an organic substance under pressurization will be described.

The organic substance contained in the raw material is not particularly limited as long as the organic substance can be carbonized. That is, as the organic substance, for example, high-molecular-weight organic compounds (e.g., resins, such as a thermosetting resin and/or a thermoplastic resin), and/or low-molecular-weight organic compounds are used. In addition, a biomass may be used as the organic substance.

As the organic substance, a nitrogen-containing organic substance is preferably used. The nitrogen-containing organic substance is not particularly limited as long as the organic substance contains an organic compound containing a nitrogen atom in the molecule. When the carbon catalyst is a carbonized product of a raw material containing the nitrogen-containing organic substance, the carbon structure of the carbon catalyst contains a nitrogen atom.

Specifically, for example, one or more kinds selected from the group consisting of polyacrylonitrile, a polyacrylonitrile-polyacrylic acid copolymer, a polyacrylonitrile-polymethyl acrylate copolymer, a polyacrylonitrile-polymethacrylic acid copolymer, a polyacrylonitrile-polymethacrylic acid-polymethallylsulfonic acid copolymer, a polyacrylonitrile-polymethyl methacrylate copolymer, a phenol resin, polyfurfuryl alcohol, furan, a furan resin, a phenol formaldehyde resin, melamine, a melamine resin, an epoxy resin, a nitrogen-containing chelate resin (e.g., one or more kinds selected from the group consisting of polyamine-type, iminodiacetic acid-type, aminophosphoric acid-type, and aminomethylphosphonic acid-type chelate resins), a polyamide-imide resin, pyrrole, polypyrrole, polyvinyl pyrrole, 3-methyl polypyrrole, acrylonitrile, polyvinylidene chloride, thiophene, oxazole, thiazole, pyrazole, vinylpyridine, polyvinylpyridine, pyridazine, pyrimidine, piperazine, pyran, morpholine, imidazole, 1-methylimidazole, 2-methylimidazole, quinoxaline, aniline, polyaniline, succinic acid dihydrazide, adipic acid dihydrazide, polysulfone, polyaminobismaleimide, polyimide, polyvinyl alcohol, polyvinyl butyral, benzimidazole, polybenzimidazole, polyamide, polyester, polylactic acid, polyether, polyether ether ketone, cellulose, carboxymethyl cellulose, lignin, chitin, chitosan, pitch, lignite, silk, wool, polyamino acid, a nucleic acid, DNA, RNA, hydrazine, hydrazide, urea, salen, polycarbazole, polybismaleimide, triazine, polyacrylic acid, polyacrylate, polymethacrylate, polymethacrylic acid, polyurethane, polyamidoamine, and polycarbodiimide are used as the organic substance.

The content of the organic substance in the raw material is not particularly limited as long as the content falls within a range in which the carbon catalyst is obtained, but may be, for example, 5 mass % or more and 90 mass % or less, and is preferably 10 mass % or more and 80 mass % or less.

The raw material for carbonization may further contain a metal. That is, in this case, the raw material containing an organic substance and a metal is carbonized under pressurization. When the carbon catalyst is a carbonized material obtained by carbonizing a raw material containing an organic substance and a metal, the carbon catalyst contains the metal.

The metal contained in the raw material (that is, the metal contained in the carbon catalyst) is preferably a transition metal. The raw material may contain one kind of transition metal or may contain two or more kinds of transition metals.

In this embodiment, the transition metal is a metal belonging to Groups III to XII in the periodic table, and is preferably a transition metal belonging to the fourth period of Groups III to XII in the periodic table. Specifically, the transition metal contained in the raw material may be, for example, one or more kinds or two or more kinds selected from the group consisting of Sc, Ti, V, Cr, Mn, Fe, Co, Ni, Cu, Zn, Y, Zr, Nb, Mo, Ru, Rh, Pd, Ag, lanthanoids (e.g., Gd), and actinoids, or the group consisting of Sc, Ti, V, Cr, Mn, Fe, Co, Ni, Cu, Zn, Y, Zr, Nb, Mo, Ag, lanthanoids (e.g., Gd), and actinoids.

In addition, the transition metal is preferably one or more kinds or two or more kinds selected from the group consisting of Fe, Co, Ni, Cu, and Zn, particularly preferably one or more kinds or two or more kinds selected from the group consisting of Fe, Co, Ni, and Zn.

The raw material may not contain Pt. In this case, the raw material may not contain one or more kinds selected from the group consisting of Pt, Ru, Rh, Pd, Ir, Au, and Os.

As the metal contained in the raw material, a simple substance of the metal and/or a compound of the metal is used. As the metal compound, for example, one or more kinds selected from the group consisting of a metal salt, a metal oxide, a metal hydroxide, a metal nitride, a metal sulfide, a metal carbide, and a metal complex may be used.

The content of the metal in the raw material (when two or more kinds of metals are used, the sum of the contents of the two or more kinds of metals) is not particularly limited as long as the content falls within a range in which the catalyst of the present invention is obtained, but may be, for example, 1 mass % or more and 90 mass % or less, and is preferably 2 mass % or more and 80 mass % or less.

The carbonization is performed under pressurization by heating a raw material and keeping the raw material at a temperature at which the raw material is carbonized (hereinafter referred to as "carbonizing temperature"). The carbonizing temperature is not particularly limited as long as the raw material is carbonized. The carbonizing temperature is, for example, 300° C. or more. That is, in this case, the raw material containing an organic substance is carbonized at a temperature of 300° C. or more under pressurization.

In addition, the carbonizing temperature may be, for example, 700° C. or more, and is preferably 900° C. or more, more preferably 1,000° C. or more, and particularly preferably 1,100° C. or more. The upper limit value of the carbonizing temperature is not particularly limited, but the carbonizing temperature is, for example, 3,000° C. or less.

The temperature increase rate up to the carbonizing temperature is, for example, 0.5° C./min or more and 300° C./min or less. In carbonization, it is not necessarily required to keep the raw material at the carbonizing temperature, but the time for keeping the raw material at the carbonizing temperature may be, for example, 1 second or more and 24 hours or less, or 5 minutes or more and 24 hours or less. The carbonization is preferably performed in an inert gas atmosphere, such as a nitrogen atmosphere. That is, the carbonization is preferably performed, for example, under the flow of an inert gas, such as a nitrogen gas.

The pressure of the atmosphere for carbonization is not particularly limited as long as the pressure is larger than the atmospheric pressure, and for example, is a pressure of 0.05 MPa or more in terms of a gauge pressure. Further, the pressure of the atmosphere for carbonization may be 0.15 MPa or more in terms of a gauge pressure, and is preferably 0.20 MPa or more, more preferably 0.40 MPa or more, and particularly preferably 0.50 MPa or more in terms of a gauge pressure. That is, in those cases, in production of the carbon catalyst, the raw material containing an organic substance is carbonized under pressurization in which a gauge pressure is equal to or more than the above-mentioned threshold value (MPa).

A method of producing a carbon catalyst may include subjecting the carbonized material obtained by carbonizing the raw material containing an organic substance to further treatment. That is, for example, the carbonized material may be subjected to ammonia treatment. In this case, for example, the raw material containing an organic substance is carbonized under pressurization, and the carbonized material obtained by the carbonization is subjected to ammonia treatment.

The ammonia treatment is not particularly limited as long as the ammonia treatment involves bringing the carbonized material into contact with ammonia. That is, the ammonia treatment is, for example, treatment of heating the carbonized material in an ammonia-containing gas atmosphere.

The ammonia content of the ammonia-containing gas is not particularly limited as long as the effect of the ammonia treatment is obtained, but may be, for example, 0.1 vol % or more, 1.0 vol % or more, or 3.0 vol % or more.

The temperature for heating the carbonized material during the ammonia treatment is not particularly limited as long as the effect of the ammonia treatment is obtained, but may be, for example, 300° C. or more, and is preferably 500° C. or more, particularly preferably 700° C. or more. The upper limit value of the heating temperature is not particularly limited, but the heating temperature may be, for example, 1,300° C. or less, and is preferably 1,000° C. or less. The range of the heating temperature during the ammonia treatment is defined by arbitrarily combining each of the above-mentioned lower limit values and each of the above-mentioned upper limit values.

In addition, the carbonized material may be subjected to metal removal treatment. In this case, for example, the raw material containing an organic substance is carbonized under pressurization, and then the carbonized material obtained by the carbonization is subjected to metal removal treatment. In addition, for example, the raw material containing an organic substance is carbonized under pressurization. Then, the carbonized material obtained by the carbonization is subjected to metal removal treatment. After that, the carbonized material after the metal removal treatment is subjected to ammonia treatment. The metal removal treatment is treatment for reducing the amounts of metals derived from the raw material which are contained in the carbonized material. The metal removal treatment is, for example, washing treatment with an acid and/or electrolytic treatment.

The electrode of the present invention includes the above-mentioned catalyst of the present invention. That is, the electrode of the present invention is, for example, a battery electrode carrying the catalyst of the present invention. Specifically, the electrode of the present invention is, for example, a battery electrode including an electrode base material and the catalyst of the present invention carried on the electrode base material.

The electrode of the present invention is, for example, an electrode for a fuel cell (e.g., a polymer electrolyte fuel cell), an air cell, a water electrolyzer (e.g., a polymer electrolyte water electrolyzer), a redox flow battery, or a halogen battery. In addition, the electrode of the present invention is, for example, a cathode or an anode, preferably a cathode. That is, the electrode of the present invention is a cathode or anode for a fuel cell, an air cell, a water electrolyzer, a redox flow battery, or a halogen battery, preferably a fuel cell cathode, an air cell cathode, a water electrolyzer cathode, a redox flow battery cathode, or a halogen battery cathode.

The battery of the present invention includes the above-mentioned battery electrode. That is, the battery of the present invention is, for example, a fuel cell (e.g., a polymer electrolyte fuel cell), an air cell, a redox flow battery, or a halogen battery including the electrode of the present invention. The battery of the present invention may include a membrane electrode assembly (MEA) including the electrode of the present invention. The battery of the present invention is a battery including the electrode of the present invention as a cathode or an anode, preferably a battery including the electrode of the present invention as a cathode. That is, the battery of the present invention is a fuel cell, an air cell, a redox flow battery, or a halogen battery including the electrode of the present invention as a cathode or an anode, preferably a fuel cell, an air cell, a redox flow battery, or a halogen battery including the electrode of the present invention as a cathode.

Next, specific Examples according to the embodiments of the present invention will be described.

EXAMPLES

[Carbon Carrier A]

1.0 g of polyacrylonitrile (PAN), 1.0 g of 2-methylimidazole, 6.0 g of zinc chloride ($ZnCl_2$), 0.18 g of iron(III) chloride hexahydrate ($FeCl_3 \cdot 6H_2O$), and 30 g of dimethylformamide were mixed. The solvent was removed from the obtained mixture by drying. The dried mixture was heated in the atmosphere to be subjected to infusibilization at 250° C.

The infusibilized mixture was carbonized by heating and keeping the infusibilized mixture at 1,300° C. under a gauge pressure of 0.90 MPa in a nitrogen atmosphere. Dilute hydrochloric acid was added to the carbonized material obtained by carbonization, and the mixture was stirred. Then, the suspension containing the carbonized material was filtered through use of a filtration membrane, and the carbonized material was washed with distilled water until the filtrate became neutral. In this manner, metal removal treatment by washing with an acid was performed.

The carbonized material after the metal removal treatment was pulverized with a fine pulverizer until a particle diameter median value thereof reached 300 nm or less. Nitric acid was added to the carbonized material after the pulverization, and the mixture was stirred. Then, the suspension containing the carbonized material was filtered through use of a filtration membrane, and the carbonized material was washed with distilled water until the filtrate became neutral. In this manner, oxidation treatment with nitric acid was performed.

The carbonized material after the oxidation treatment was heated at a temperature increase rate of 50° C./min in an atmosphere in which a 100% ammonia gas was supplied at 0.15 L/min, and kept at 900° C. for 1 hour. After that, the ammonia gas was substituted with nitrogen, and the carbonized material was kept at 500° C. for 10 minutes in a nitrogen atmosphere. In this manner, ammonia treatment with an ammonia gas was performed. Then, the carbonized material cooled by natural cooling in a nitrogen atmosphere was obtained as a carbon carrier A.

[Carbon Carrier D]

1.0 g of polyacrylonitrile (PAN), 1.0 g of 2-methylimidazole, 6.0 g of zinc chloride ($ZnCl_2$), 0.18 g of iron(III) chloride hexahydrate ($FeCl_3 \cdot 6H_2O$), and 30 g of dimethylformamide were mixed. The solvent was removed from the obtained mixture by drying. The dried mixture was heated in the atmosphere to be subjected to infusibilization at 250° C.

The infusibilized mixture was carbonized by heating and keeping the infusibilized mixture at 1,200° C. under normal pressure in a nitrogen atmosphere. Dilute hydrochloric acid was added to the carbonized material obtained by carbonization, and the mixture was stirred. Then, the suspension containing the carbonized material was filtered through use of a filtration membrane, and the carbonized material was washed with distilled water until the filtrate became neutral. In this manner, metal removal treatment by washing with an acid was performed.

The carbonized material after the metal removal treatment was pulverized with a fine pulverizer until a particle diameter median value thereof reached 600 nm or less. Nitric acid was added to the carbonized material after the pulverization, and the mixture was stirred. Then, the suspension containing the carbonized material was filtered through use of a filtration membrane, and the carbonized material was washed with distilled water until the filtrate became neutral. In this manner, oxidation treatment with nitric acid was performed.

The carbonized material after the oxidation treatment was heated at a temperature increase rate of 50° C./min in an atmosphere in which a 100% ammonia gas was supplied at 0.15 L/min, and kept at 900° C. for 1 hour. After that, the ammonia gas was substituted with nitrogen, and the carbonized material was kept at 500° C. for 10 minutes in a nitrogen atmosphere. In this manner, ammonia treatment with an ammonia gas was performed. Then, the carbonized material cooled by natural cooling in a nitrogen atmosphere was obtained as a carbon carrier D.

[Carbon Carrier M]

Nitric acid was added to commercially available mesoporous carbon, and the mixture was stirred. Then, the suspension containing the mesoporous carbon was filtered through use of a filtration membrane, and the mesoporous carbon was washed with distilled water until the filtrate became neutral. In this manner, oxidation treatment with nitric acid was performed.

The mesoporous carbon after the oxidation treatment was heated at a temperature increase rate of 50° C./min in an atmosphere in which a 100% ammonia gas was supplied at 0.15 L/min, and kept at 900° C. for 1 hour. After that, the ammonia gas was substituted with nitrogen, and the mesoporous carbon was kept at 500° C. for 10 minutes in a nitrogen atmosphere. In this manner, ammonia treatment with an ammonia gas was performed. Then, the mesoporous carbon cooled by natural cooling in a nitrogen atmosphere was obtained as a carbon carrier M.

[Carbon Carrier KB]

A carbon carrier KB was obtained by the same method as that of the above-mentioned carbon carrier M except that Ketjen Black EC600JD (manufactured by Lion Specialty Chemicals Co., Ltd.) was used instead of the mesoporous carbon.

Example 1

An iron chloride aqueous solution was prepared by dissolving iron(III) chloride hexahydrate ($FeCl_3 \cdot 6H_2O$) in water so that the concentration of iron became 0.1 wt %. The carbon carrier A was added to the iron chloride aqueous solution, and the mixture was stirred for 16 hours to obtain a suspension. The obtained suspension was filtered and then dried at 100° C. for 16 hours to obtain powder of the carbon carrier A impregnated with iron.

A chloroplatinic acid aqueous solution was prepared by dissolving chloroplatinic acid ($H_2PtCl_6$) in water so that the concentration of platinum became 1.6 wt %. The powder of the carbon carrier A impregnated with iron was added to the chloroplatinic acid aqueous solution, and the mixture was stirred for 16 hours to obtain a suspension. In this case, the amount of the chloroplatinic acid aqueous solution was adjusted so that the final supported amount of platinum became 20 wt %. The obtained suspension was filtered and then dried at 100° C. for 16 hours to obtain powder of the carbon carrier A impregnated with platinum and iron.

The powder of the carbon carrier A impregnated with platinum and iron thus obtained was heated from room temperature to 900° C. at a temperature increase rate of 50° C./min through use of a high-frequency furnace in a vacuum atmosphere, and kept for 1 hour to obtain a metal-supported catalyst.

The supported amount of platinum of the metal-supported catalyst (proportion of the weight of platinum supported on the metal-supported catalyst to the weight of the metal-supported catalyst) obtained by ICP-MS measurement was 20 wt %. In addition, the molar ratio (Pt/Fe ratio) of platinum to iron contained in the metal-supported catalyst obtained by ICP-MS measurement was 5.0.

Example 2

A cobalt chloride aqueous solution was prepared by dissolving cobalt(II) chloride hexahydrate ($CoCl_2 \cdot 6H_2O$) in water so that the concentration of cobalt became 0.1 wt %. The carbon carrier M was added to the cobalt chloride aqueous solution, and the mixture was stirred for 16 hours to obtain a suspension. The obtained suspension was filtered and then dried at 100° C. for 16 hours to obtain powder of the carbon carrier M impregnated with cobalt.

A chloroplatinic acid aqueous solution was prepared by dissolving chloroplatinic acid ($H_2PtCl_6$) in water so that the concentration of platinum became 1.6 wt %. The powder of the carbon carrier M impregnated with cobalt was added to the chloroplatinic acid aqueous solution, and the mixture was stirred for 16 hours to obtain a suspension. In this case, the amount of the chloroplatinic acid aqueous solution was adjusted so that the final supported amount of platinum became 30 wt %. The obtained suspension was filtered and then dried at 100° C. for 16 hours to obtain powder of the carbon carrier M impregnated with platinum and cobalt.

The powder of the carbon carrier M impregnated with platinum and cobalt thus obtained was heated from room temperature to 900° C. at a temperature increase rate of 450° C./min through use of a millimeter wave in a hydrogen atmosphere in which a hydrogen gas was supplied at a flow rate of 100 mL/min, and kept for 1 hour to obtain a metal-supported catalyst.

The supported amount of platinum of the obtained metal-supported catalyst obtained by ICP-MS measurement was 30 wt %. In addition, the molar ratio (Pt/Co ratio) of platinum to cobalt contained in the metal-supported catalyst was 7.0.

Example 3

A metal-supported catalyst was obtained by the same method as in Example 2 described above except that the carbon carrier A was used instead of the carbon carrier M, and nickel(II) chloride hexahydrate ($NiCl_2 \cdot 6H_2O$) was used instead of cobalt chloride.

The supported amount of platinum of the obtained metal-supported catalyst obtained by ICP-MS measurement was 30 wt %. In addition, the molar ratio (Pt/Ni ratio) of platinum to nickel contained in the metal-supported catalyst was 7.0.

Example 4

A metal-supported catalyst was obtained by the same method as in Example 2 described above except that the carbon carrier D was used instead of the carbon carrier M, iron(III) chloride hexahydrate ($FeCl_3 \cdot 6H_2O$) was used instead of cobalt chloride, and the amount of the chloroplatinic acid aqueous solution was adjusted so that the final supported amount of platinum became 20 wt %.

The supported amount of platinum of the metal-supported catalyst obtained by ICP-MS measurement was 20 wt %. In addition, the molar ratio (Pt/Fe ratio) of platinum to iron contained in the metal-supported catalyst obtained by ICP-MS measurement was 5.0.

Example 5

A metal-supported catalyst was obtained by the same method as in Example 4 described above except that the carbon carrier A was used instead of the carbon carrier D. The supported amount of platinum of the metal-supported catalyst obtained by ICP-MS measurement was 20 wt %. In addition, the molar ratio (Pt/Fe ratio) of platinum to iron contained in the metal-supported catalyst obtained by ICP-MS measurement was 5.0.

Example 6

A metal-supported catalyst was obtained by the same method as in Example 2 described above except that the carbon carrier A was used instead of the carbon carrier M. The supported amount of platinum of the obtained metal-supported catalyst obtained by ICP-MS measurement was 30 wt %. In addition, the molar ratio (Pt/Co ratio) of platinum to cobalt contained in the metal-supported catalyst was 7.0.

Example 7

A metal-supported catalyst was obtained by the same method as in Example 4 described above except that the carbon carrier KB was used instead of the carbon carrier D. The supported amount of platinum of the metal-supported catalyst obtained by ICP-MS measurement was 20 wt %. In addition, the molar ratio (Pt/Fe ratio) of platinum to iron contained in the metal-supported catalyst obtained by ICP-MS measurement was 5.0.

Example 8

A metal-supported catalyst was obtained by the same method as in Example 2 described above except that nickel (II) chloride hexahydrate ($NiCl_2 \cdot 6H_2O$) was used instead of cobalt chloride, and the amount of the chloroplatinic acid aqueous solution was adjusted so that the final supported amount of platinum became 20 wt %. The supported amount of platinum of the obtained metal-supported catalyst obtained by ICP-MS measurement was 20 wt %. In addition, the molar ratio (Pt/Ni ratio) of platinum to nickel contained in the metal-supported catalyst was 7.0.

Example 9

A metal-supported catalyst was obtained by the same method as in Example 5 described above except that iron chloride was not used. The supported amount of platinum of the metal-supported catalyst obtained by ICP-MS measurement was 20 wt %.

[Inductively Coupled Plasma Mass Spectrometry (ICP-MS)]

The metal content of the metal-supported catalyst was measured by ICP-MS. That is, first, 25 mg of a metal-supported catalyst was heated and kept at 800° C. for 3 hours in an atmospheric atmosphere to remove non-metal components in the metal-supported catalyst. Then, the metal contained in the metal-supported catalyst was dissolved by immersing the metal-supported catalyst in 5 mL of aqua regia. Further, distilled water was added to dilute the resultant so that the total weight became 25 g to obtain a metal solution. After that, the Pt concentration and the transition metal concentration of the obtained metal solution were measured through use of a sequential-type plasma emission spectrometer (ICP-8100, manufactured by Shimadzu Corporation).

Then, the value obtained by multiplying the Pt concentration (mg/g) of the metal solution by the weight (25 g) of the metal solution was divided by the weight (25 mg) of the metal-supported catalyst, and the value thus obtained was multiplied by 100 to calculate a Pt content (wt %) of the metal-supported catalyst.

In addition, the value obtained by multiplying the transition metal concentration (mg/g) of the metal solution by the weight (25 g) of the metal solution was divided by the weight (25 mg) of the metal-supported catalyst, and the value thus obtained was multiplied by 100 to calculate a transition metal content (wt %) of the metal-supported catalyst.

Further, the value obtained by dividing the Pt content (wt %) by the Pt atomic weight was divided by the value obtained by dividing the transition metal content (wt %) by the transition metal atomic weight, to thereby calculate a molar ratio of Pt/transition metal. In addition, the sum of the Pt content (wt %) and the transition metal content (wt %) of the metal-supported catalyst was obtained as the metal content (wt %) of the metal-supported catalyst.

[Elemental Analysis by Combustion Method (CHN)]

Elemental analysis was performed by a combustion method of the metal-supported catalyst. That is, the nitrogen atom content, the carbon atom content, and the hydrogen atom content of the metal-supported catalyst were measured by the combustion method through use of an organic trace element analyzer (2400II, PerkinElmer Co., Ltd.). Specifically, 2 mg of a metal-supported catalyst was analyzed through use of helium as a carrier gas under the conditions of a combustion tube temperature of 980° C. and a reduction tube temperature of 640° C.

Then, each weight of nitrogen atoms, carbon atoms, and hydrogen atoms contained in the metal-supported catalyst was divided by the weight of the metal-supported catalyst, and each resultant value was multiplied by 100, to thereby calculate a nitrogen atom content (wt %), a carbon atom content (wt %), and a hydrogen atom content (wt %) of the metal-supported catalyst. Further, the nitrogen atom content (wt %) was divided by the carbon atom content (wt %) to calculate a N/C ratio by elemental analysis.

[X-Ray Photoelectron Spectroscopy (XPS)]

Through use of an X-ray photoelectron spectrometer (AXIS NOVA, manufactured by KRATOS), the photoelectron spectrum from each of core levels of platinum atoms, iron atoms, cobalt atoms, nickel atoms, oxygen atoms, chlorine atoms, carbon atoms, and nitrogen atoms on the surface of the metal-supported catalyst was measured. An AlKα ray (10 mA, 15 kV, Pass energy: 40 eV) was used as an X-ray source. In the obtained photoelectron spectrum, the binding energy was corrected so that the peak top of a C1s peak derived from a is orbital of the carbon atoms was positioned at 284.5 eV.

In XPS wide scan analysis, the atomic concentrations (atom %) of platinum atoms, carbon atoms, and nitrogen atoms on the surface of the metal-supported catalyst were determined from the peak area and the detection sensitivity coefficient in the photoelectron spectrum. In addition, the nitrogen atom concentration (atom %) was divided by the carbon atom concentration (atom %) to calculate a N/C ratio by XPS.

Further, the platinum content (wt %) of the metal-supported catalyst by XPS was determined from the platinum peak area, the detection sensitivity coefficient, and the atomic weight. Herein, calculation was performed under the assumption that the metal-supported catalyst did not contain atoms other than platinum atoms, iron atoms, cobalt atoms, nickel atoms, oxygen atoms, chlorine atoms, carbon atoms, and nitrogen atoms.

[Specific Surface Area, Pore Volume]

The specific surface area and pore volume of the metal-supported catalyst were measured through use of a specific surface area/pore distribution measuring device (Tristar 3000, manufactured by Shimadzu Corporation). That is, first, water adsorbed on the metal-supported catalyst was removed by keeping 0.1 g of the metal-supported catalyst at 100° C. and $6.7 \times 10^{-2}$ Pa for 3 hours. Then, the specific surface area (m$^2$/g) of the metal-supported catalyst was obtained from a nitrogen adsorption isotherm at 77 K by a BET method. The nitrogen adsorption isotherm at 77 K was obtained by measuring a change in amount of nitrogen adsorbed on the metal-supported catalyst in association with a change in pressure of a nitrogen gas at a temperature of 77 K.

Meanwhile, from the nitrogen adsorption isotherm at a temperature of 77 K, the volume (cm$^3$/g) of pores each having a diameter of 0.5 nm or more and 2.0 nm or less, the volume (cm$^3$/g) of pores each having a diameter of more than 2.0 nm and 4.0 nm or less, and the volume (cm$^3$/g) of pores each having a diameter of more than 4.0 nm and 50.0 nm or less were obtained by a BJH method. The BJH method is a typical method of obtaining the distribution of mesopores proposed by Barrett, Joyner, and Halenda (E P Barrett, L G Joyner and P P Halenda, J Am Chem Soc, 73, 373, (1951)).

In addition, based on the specific surface area and pore volume of the metal-supported catalyst and the above-mentioned metal content obtained by ICP-MS, the specific surface area and pore volume per weight of the carbon carrier contained in the metal-supported catalyst were also calculated. That is, by dividing the specific surface area and pore volume of the metal-supported catalyst by the weight ratio of the carbon carrier contained in the metal-supported catalyst calculated by the following equation, the specific surface area and pore volume per weight of the carbon carrier were calculated: weight ratio of carbon carrier=1−(metal content (wt %) obtained by ICP-MS)/100.

[Powder X-Ray Diffraction (XRD)]

When a catalyst contains platinum particles (pure platinum particles and/or platinum alloy particles), a platinum (111) diffraction line appears at a position at which a diffraction angle (2θ) is in the vicinity of 40° (for example, in a range of from 36° to 44°) in an X-ray diffraction pattern obtained by powder X-ray diffraction using a CuKα ray.

In this respect, in a metal-supported catalyst containing a carbon carrier and platinum particles supported on the carbon carrier, a diffraction line having a peak top at a position at which the diffraction angle (2θ) is in the vicinity of 40° appears in the X-ray diffraction pattern. The diffraction line includes at least three kinds of diffraction lines, that is, a diffraction line derived from pure platinum, a diffraction line derived from a platinum alloy, and a diffraction line derived from the carbon structure of a carbon carrier.

Herein, the diffraction line derived from pure platinum is defined as a diffraction line having a peak top at a position at which the diffraction angle (2θ) is 39.6° or more and less than 39.8°. The diffraction line derived from a platinum alloy is defined as a diffraction line having a peak top at a position at which the diffraction angle (2θ) is 39.9° or more and less than 43.0°. The diffraction line derived from the carbon structure of a carbon carrier is defined as a diffraction line having a peak top at a position at which the diffraction angle (2θ) is 43.3° or more and less than 43.7°.

Accordingly, regarding a metal-supported catalyst containing a carbon carrier and pure platinum particles and platinum alloy particles supported on the carbon carrier, the diffraction line having a peak top at a position at which the diffraction angle (2θ) is in the vicinity of 40° in the X-ray diffraction pattern can be separated into at least three kinds of diffraction lines.

In addition, when the metal-supported catalyst contains a plurality of kinds of platinum alloys having different compositions and/or crystal structures, a plurality of diffraction lines derived from a platinum alloy appear. The diffraction angle at which the peak top of the diffraction line derived from the platinum alloy is positioned is determined by the composition and crystal structure thereof. For example, the diffraction line derived from an iron-platinum alloy represented by a composition of FePt is defined as a diffraction line having a peak top at a position at which the diffraction angle is 41.1° or more and less than 41.5°. In addition, the diffraction line derived from an iron-platinum alloy represented by a composition of $FePt_3$ is defined as a diffraction line having a peak top at a position at which the diffraction angle is 40.1° or more and less than 40.5°. Similarly, the diffraction angle at which the peak top of a diffraction line is positioned is, for example, 39.9° or more and less than 40.1° for an iron-platinum alloy $FePt_7$, 41.1° or more and less than 41.5° for a cobalt-platinum alloy CoPt, 40.1° or more and less than 40.5° for a cobalt-platinum alloy $CoPt_3$, 39.9° or more and less than 40.1° for a cobalt-platinum alloy $CoPt_7$, 41.1° or more and less than 41.5° for a nickel-platinum alloy NiPt, 40.1° or more and less than 40.5° for a nickel-platinum alloy $NiPt_3$, and 39.9° or more and less than 40.1° for a nickel-platinum alloy $NiPt_7$.

Further, when the metal-supported catalyst contains a plurality of kinds of platinum particles having the same composition and crystal structure and different crystallite diameters, a plurality of diffraction lines appear, each having a peak top at the same diffraction angle position and different full widths at half maximum.

Accordingly, when the metal-supported catalyst contains a plurality of kinds of platinum alloys having different compositions and/or crystal structures, and/or when the metal-supported catalyst contains a plurality of platinum particles having the same composition and crystal structure and different crystallite diameters, in an X-ray diffraction pattern obtained through use of a CuKα ray, the diffraction line having a peak top at a position at which the diffraction angle (2θ) is in the vicinity of 40° includes four or more kinds of diffraction lines. In this case, the diffraction line having a peak top at a position at which the diffraction angle (2θ) is in the vicinity of 40° can be separated into four or more kinds of diffraction lines (diffraction line derived from pure platinum, diffraction lines derived from two or more kinds of platinum alloys, and diffraction line derived from the carbon structure of a carbon carrier).

Now, a method of analyzing a metal-supported catalyst by powder XRD will be specifically described. First, a sample of a powdery metal-supported catalyst was placed in a recess (2 cm×2 cm×0.5 mm (thickness)) of a glass sample plate and pressed with a slide glass. Thus, the sample was uniformly filled into the recess so that the surface of the sample and a reference surface were matched with each other. Then, the glass sample plate was fixed to a wide-angle X-ray diffraction sample table without the filled sample getting out of shape.

Then, powder X-ray diffraction (XRD) measurement was performed through use of an X-ray diffractometer (Rigaku RINT2100/PC, Rigaku Corporation). The voltage and current applied to an X-ray tube were set to 50 kV and 300 mA, respectively. The sampling interval was set to 0.1°, the scanning speed was set to 1°/min, and the measurement angle range (2θ) was set to from 5° to 90°. CuKα was used as an incident X-ray. The sample thickness was set to 0.5 mm, and the divergence slit width β was set to 2/3°.

In the obtained XRD pattern, the platinum (111) diffraction line appeared at a position at which the diffraction angle (2θ) was in the vicinity of 40°. Then, first, baseline correction was performed. That is, a straight line connecting the diffraction intensity at which the diffraction angle (2θ) was in the vicinity of from 35° to 37° and the diffraction intensity at which the diffraction angle (2θ) was in the vicinity of from 50° to 52° was determined as a baseline, and the baseline was subtracted from each intensity of the diffraction line, to thereby perform the baseline correction.

Next, the diffraction line after the baseline correction was separated into a peak derived from pure Pt, a peak derived from one or more kinds of Pt alloys, and a peak derived from carbon. The separation of the diffraction line was performed by assuming that each of a plurality of peaks obtained by the separation was represented by a Gaussian function and optimizing the intensity of each of the Gaussian functions of the plurality of peaks, the diffraction angle of a peak top, and the full width at half maximum so that a residual square sum obtained by adding, regarding all the diffraction angles, a square of a difference (residue) from the sum of the intensity of the diffraction line and each intensity of the plurality of peaks at each diffraction angle of an XRD pattern became minimum.

Herein, the peak separation of the platinum (111) diffraction line having a peak top at a position at which the diffraction angle (2θ) is in the vicinity of 40° (in a range of from 36° to 44°) will be described by taking the metal-supported catalyst of Example 6 as an example.

In an XRD pattern obtained by powder XRD measurement of the metal-supported catalyst of Example 6, a diffraction line having a peak top at a position at which the diffraction angle (2θ) was 40.0° appeared after the baseline correction. The shape of an upper part of this diffraction line was significantly smaller in width than the shape of a lower part. Because of this, it was conceived that, when the diffraction angle (2θ) was in the vicinity of 40.0°, the diffraction line of a first platinum alloy having a smaller full width at half maximum and the diffraction line of a second platinum alloy having a crystallite diameter different from that of the first platinum alloy and having a full width at half maximum larger than that of the first platinum alloy were overlapped. In addition, the metal-supported catalyst contained a carbon carrier, and hence a diffraction line derived from carbon appeared at a position at which the diffraction angle (2θ) was in the vicinity of 43.5°.

Then, the diffraction line having a diffraction angle (2θ) in the vicinity of 40° was separated into three components formed of a peak derived from the first platinum alloy, a peak derived from the second platinum alloy, and a peak derived from carbon.

The results of the peak separation into those three components are shown in FIG. 1A. In FIG. 1A, a diffraction line "after baseline correction" represents a diffraction line obtained by subjecting a diffraction line obtained by XRD measurement to the baseline correction, and a peak of "alloy 1", a peak of "alloy 2", and a peak of "carbon" represent a peak derived from the first platinum alloy, a peak derived from the second platinum alloy, and a peak derived from the carbon, respectively, obtained by the peak separation of the diffraction line "after baseline correction". In addition, a peak of "alloy 1+2+carbon" represents a peak obtained by adding the peak of "alloy 1", the peak of "alloy 2", and the peak of "carbon".

However, as shown in FIG. 1A, when the peak separation of the diffraction line after baseline correction was performed so that the spread of a tail at the diffraction angle (2θ) in the vicinity of 37° and the shape of a peak top in the vicinity of 40° were matched, shoulders in the vicinity of 39.6° and 41.0° could not be reproduced.

In this respect, as described above, the diffraction line derived from the pure platinum has a peak top at a position at which the diffraction angle (2θ) is 39.6° or more and less than 39.8°, and the diffraction line derived from the platinum alloy has a peak top at a position at which the diffraction angle (2θ) is 39.9° or more and less than 43.0°. Accordingly, it was conceived that, in the diffraction line after baseline correction, a diffraction line derived from pure Pt having a peak top at a position in the vicinity of 39.6° and a diffraction line derived from a third platinum alloy having a peak top at a position in the vicinity of 41.0° were mixed.

Then, the diffraction line having a diffraction angle (2θ) in the vicinity of 40° was separated into five components formed of a peak derived from the pure platinum, a peak derived from the first platinum alloy, a peak derived from the second platinum alloy, a peak derived from the third platinum alloy, and a peak derived from the carbon.

Figure 1B:
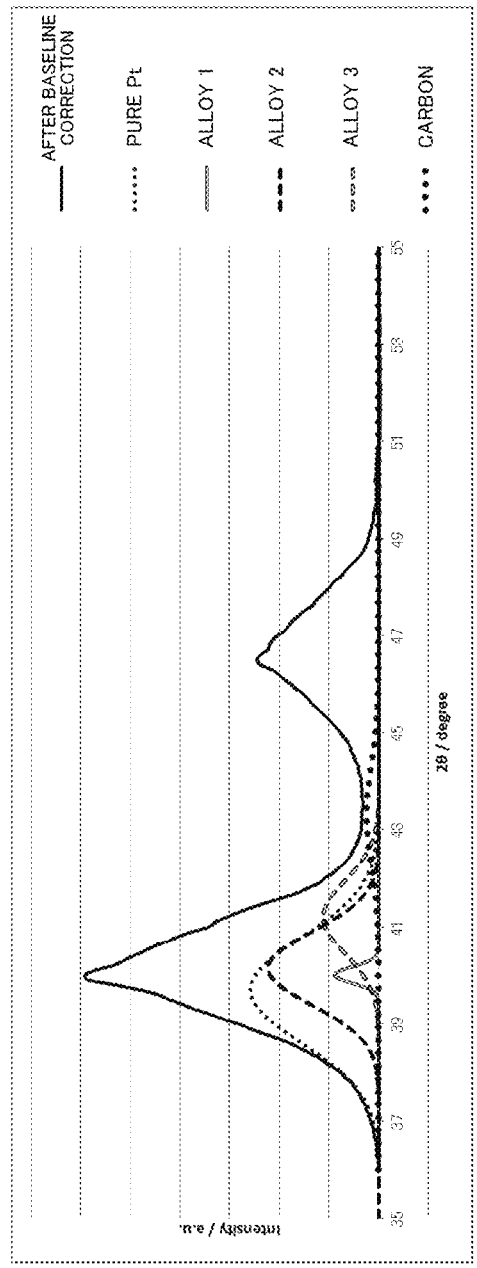
FIG. 1B is an explanatory graph showing another example of peak separation in a powder X-ray diffraction pattern.

The results of the peak separation into those five components are shown in FIG. 1B. In FIG. 1B, a diffraction line "after baseline correction" represents a diffraction line obtained by subjecting a diffraction line obtained by XRD measurement to the baseline correction, and a peak of "pure Pt", a peak of "alloy 1", a peak of "alloy 2", a peak of "alloy 3", and a peak of "carbon" represent a peak derived from the pure platinum, a peak derived from the first platinum alloy, a peak derived from the second platinum alloy, a peak derived from the third platinum alloy, and a peak derived from the carbon, respectively, obtained by the peak separation of the diffraction line "after baseline correction".

A peak obtained by adding the peak of "pure Pt", the peak of "alloy 1", the peak of "alloy 2", the peak of "alloy 3", and the peak of "carbon" was substantially completely matched with the diffraction line "after baseline correction", and hence is not shown in FIG. 1B.

As described above, a residual square sum in the case of the peak separation into the five components was reduced compared to the residual square sum in the case of the peak separation into the three components, and became a significantly small value. Accordingly, it was concluded that the pure platinum particles, the first platinum alloy particles, the second platinum alloy particles, and the third platinum alloy particles were supported as the Pt particles on the metal-supported catalyst of Example 6.

Then, the crystallite diameter of each of the pure platinum particles, the first platinum alloy particles, the second platinum alloy particles, and the third platinum alloy particles was calculated by the following Scherrer equation: crystallite diameter=$K\lambda/\beta \cos \theta$. Herein, in the Scherrer equation, K represents a Scherrer constant (0.94), λ represents the wavelength of a CuKα ray (0.15418 nm), β represents a full width at half maximum (radian), and θ represents a diffraction angle (radian). That is, for example, the crystallite diameter of the pure platinum particles was calculated by substituting the diffraction angle and the full width at half maximum of the separation peak of "pure Pt" in the XRD pattern shown in FIG. 1B into the above-mentioned Scherrer equation.

In addition, the areas of Pt separation peaks obtained by the above-mentioned peak separation (that is, the peak area of "pure Pt", the peak area of "alloy 1", the peak area of "alloy 2", and the peak area of "alloy 3") were each divided by the sum of the areas of the Pt separation peaks to calculate a peak area proportion of each of the Pt separation peaks. Then, an average crystallite diameter of the catalyst metal particles was calculated as a weighted average using those peak area proportions as weights.

Specifically, in FIG. 2, there are shown crystallite diameters and peak area proportions of "pure Pt", "alloy 1", "alloy 2", and "alloy 3" calculated for the metal-supported catalyst of Example 6. The average crystallite diameter of the Pt particles (pure Pt particles and Pt alloy particles) supported on the metal-supported catalyst of Example 6 was calculated to be 5.09 nm by the following equation: average crystallite diameter $$(nm)=(3.9\times52.3)/100+(24.5\times3.4)/100+(4.9\times30.4)/100+(5.2\times13.9)/100.$$

In addition, of "pure Pt", "alloy 1", "alloy 2", and "alloy 3", the sum of the peak area proportions of Pt particles each having a crystallite diameter of 5.0 nm was calculated as a proportion (%) of the amount of the Pt particles each having a crystallite diameter of 5.0 nm or less to the total amount of the Pt particles. Specifically, regarding the metal-supported catalyst of Example 6, as shown in FIG. 2, the crystallite diameters of "pure Pt" and "alloy 2" were 5.0 nm or less, and hence 82.7% (=52.3%+30.4%) that was a sum of the peak area proportions of the "pure Pt" and "alloy 2" was calculated as a proportion of the catalyst metal particles each having a crystallite diameter of 5.0 nm or less.

In addition, the proportion (%) of the area of the separation peak derived from pure Pt obtained by the peak separation of the platinum (111) diffraction line to the sum of the area of the separation peak derived from the pure Pt and the area of the separation peak derived from one or more Pt alloys was calculated as a proportion (%) of the supported amount of pure Pt to the sum of the supported amount of the pure Pt and the supported amount of the Pt alloys in the metal-supported catalyst. Further, a value obtained by subtracting the proportion of the supported amount of pure Pt from 100 was obtained as a proportion (%) of the supported amount of the Pt alloy.

[Proportion of Catalyst Metal Particles each having Particle Diameter of 5.0 nm or Less (TEM Observation)]

The proportion (%) of the catalyst metal particles each having a particle diameter of 5.0 nm or less was calculated through use of a transmission electron microscope (TEM) by the following method.

TEM observation of a metal-supported catalyst was performed at a magnification of 400,000 times or more through use of a JEM-2010 type transmission electron microscope manufactured by JEOL Ltd. That is, in the obtained TEM image, the length of the longest portion of 100 randomly selected particles was measured as a particle diameter. Then, the value obtained by dividing the number of the particles each having a particle diameter of 5 nm or less by the total number of 100 of the particles was multiplied by 100, to thereby calculate a proportion (%) of the particles each having a particle diameter of 5 nm or less.

Figure 3:
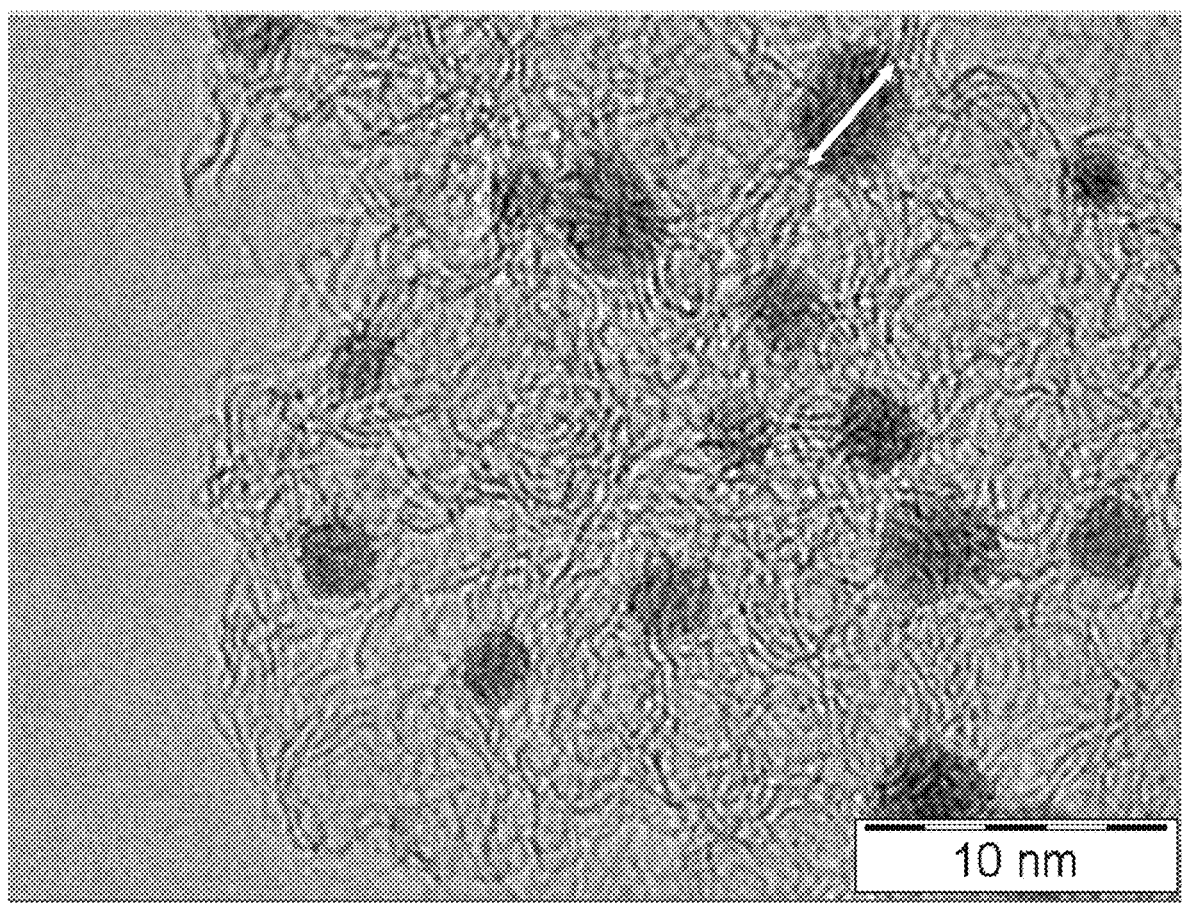
FIG. 3 is an explanatory view showing an example of evaluation of particle diameters of catalyst metal particles in a transmission electron microscope image.

In FIG. 3, there is shown a TEM image of the metal-supported catalyst of Example 6 as an example of a TEM image used for evaluating the proportion of the catalyst metal particles each having a particle diameter of 5.0 nm or less. As shown for one of the particles shown in FIG. 3, the length of the longest portion indicated by the arrow was measured as a particle diameter.

[Average Particle Diameter of Metal-Supported Catalyst (μm)]

The average particle diameter of the metal-supported catalyst containing a carbon carrier and catalyst metal particles was measured. That is, the particle diameter of the metal-supported catalyst was measured by a laser diffraction method through use of a nanoparticle diameter distribution measuring device (SALD-7100H, manufactured by Shimadzu Corporation).

Specifically, first, one drop of a surfactant was added to 10 mg of the metal-supported catalyst, and then 40 g of distilled water was added to prepare a suspension. After that, homogenizer treatment was performed for 20 minutes to prepare a dispersion. The prepared dispersion was added dropwise to a flow cell in which distilled water was supplied until the maximum value of a diffraction/scattering light intensity reached 50±5, and the particle diameter was measured. The median diameter (d50) determined from the obtained particle diameter distribution (number distribution) was obtained as an average particle diameter. In particle diameters in which the frequency (%) of the obtained particle diameter distribution (number distribution) was 0.001 or more, the maximum value and the minimum value were defined as a maximum particle diameter and a minimum particle diameter, respectively.

[Proportion of Catalyst Metal Particles on Outermost Surface]

First, an HAADF-STEM image and an STEM secondary electron image of Pt particles supported on each of the metal-supported catalysts of Example 1, Example 3, and Example 6 were acquired through use of a field emission transmission electron microscope (JEM-2100F, manufactured by JEOL Ltd.).

The HAADF-STEM image is a transmission electron image, and hence the metal particles inside the carbon carrier particles, as well as the metal particles on the surface of each of the carbon carrier particles, can be observed. Meanwhile, in the STEM secondary electron image, only the metal particles on the outermost surface of the carbon carrier can be observed.

Next, image analysis of the HAADF-STEM image and the STEM secondary electron image was performed. That is, image analysis of the HAADF-STEM image was performed through use of an image processing analysis device (LUZEX AP, manufactured by Nireco Corporation), and the number of metal particles in a specific field of view of the HAADF-STEM image was calculated. In addition, similarly, image analysis of the STEM secondary electron image was performed, and the number of metal particles in a specific field of view corresponding to the specific field of view of the HAADF-STEM image in the STEM secondary electron image was calculated. Then, the value obtained by dividing the number of the metal particles in the STEM secondary electron image by the number of the metal particles in the HAADF-STEM image was multiplied by 100, to thereby calculate a proportion of the catalyst metal particles on the outermost surface of the metal-supported catalyst.

Figure 4A:
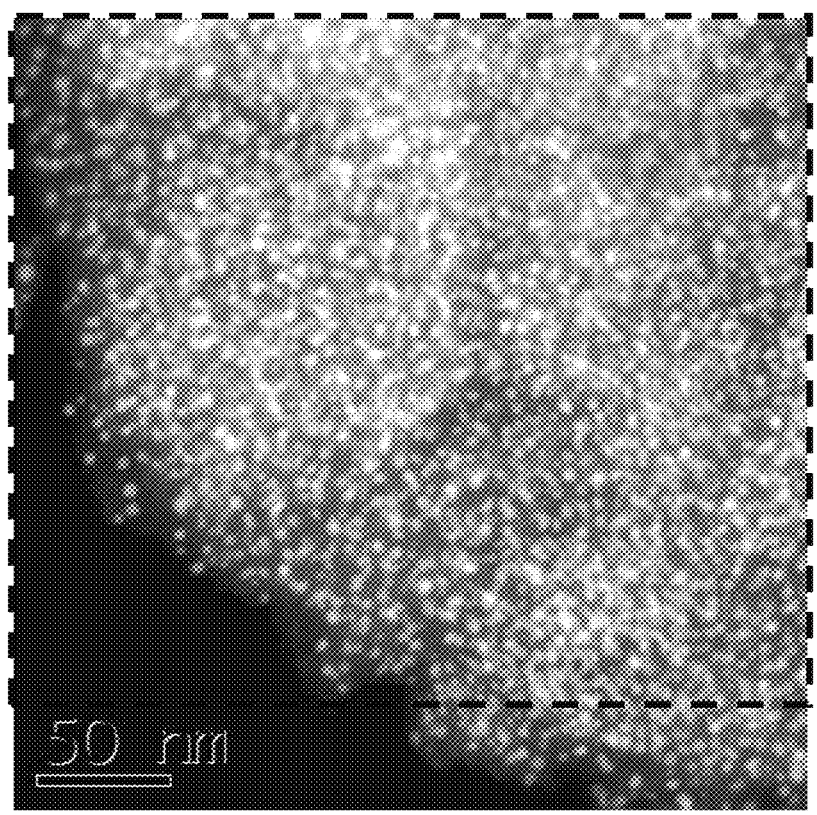
FIG. 4A is an explanatory view showing an example of an HAADF-STEM image obtained in Example according to one embodiment of the present invention.
Figure 4B:
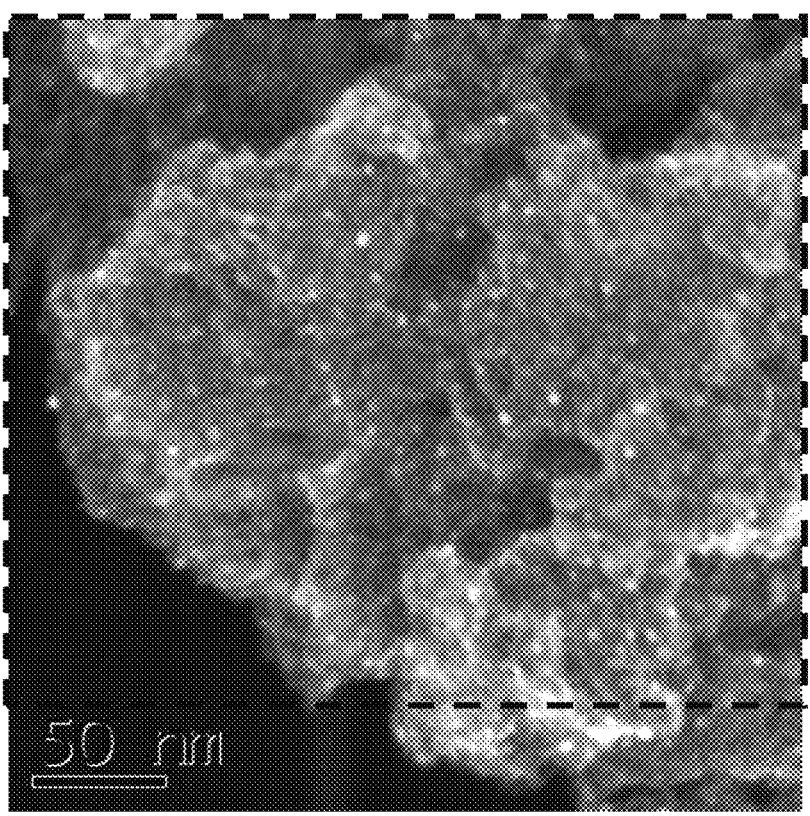
FIG. 4B is an explanatory view showing an example of an STEM secondary electron image obtained in Example according to one embodiment of the present invention.

In FIG. 4A and FIG. 4B, there are shown the HAADF-STEM image and the STEM secondary electron image acquired for the metal-supported catalyst of Example 6, respectively. As shown in FIG. 4A, in the HAADF-STEM image, metal particles that were present on the surface of the carbon carrier and inside the carbon carrier were observed. Meanwhile, as shown in FIG. 4B, in the STEM secondary electron image, only the metal particles that were present on the surface of the carbon carrier were observed.

The number of metal particles in a field of view surrounded by the broken line in FIG. 4A was 1,219. In addition, the number of metal particles in a field of view surrounded by the broken line in FIG. 4B was 125. Accordingly, in the metal-supported catalyst of Example 6, the proportion of the catalyst metal particles on the outermost surface was calculated to be about 10%. Similarly, the proportion of catalyst metal particles on the outermost surface of the metal-supported catalyst was about 13% in Example 1 and about 4% in Example 3.

[Raman Spectroscopy]

The metal-supported catalyst was analyzed by Raman spectroscopy. The Raman spectrum was measured through use of a HORIBA microlaser Raman spectroscopic measuring device (LabRAM, HORIBA Jobin Yvon). The laser used for the measurement had an excitation wavelength of 532 nm and an output of 50 mW, and measurement was performed through a neutral density filter D3 under the conditions of exposure of 90 seconds×integration of 2 times to obtain a Raman spectrum.

The obtained Raman spectrum was subjected to baseline correction. That is, a straight line connecting the scattering intensity at which a Raman shift ($cm^{-1}$) was in the vicinity of 800 $cm^{-1}$ and the scattering intensity at which a Raman shift ($cm^{-1}$) was in the vicinity of 2,000 $cm^{-1}$ was determined as a baseline, and the baseline was subtracted from each intensity of the scattering spectrum, to thereby perform the baseline correction.

Next, a G band having a peak top in the vicinity of 1,600 $cm^{-1}$ and a D band having a peak top in the vicinity of 1,360 $cm^{-1}$ were identified. Further, based on an intensity $I_g$ of the G band (intensity of the peak top of the G band), an intensity $I_d$ of the D band (intensity of the peak top of the D band), and a minimum intensity $I_v$ between the G band and the D band, a full width at half maximum ($cm^{-1}$) of the G band, a full width at half maximum ($cm^{-1}$) of the D band, and an $I_v/I_g$ ratio were obtained.

Figure 5:
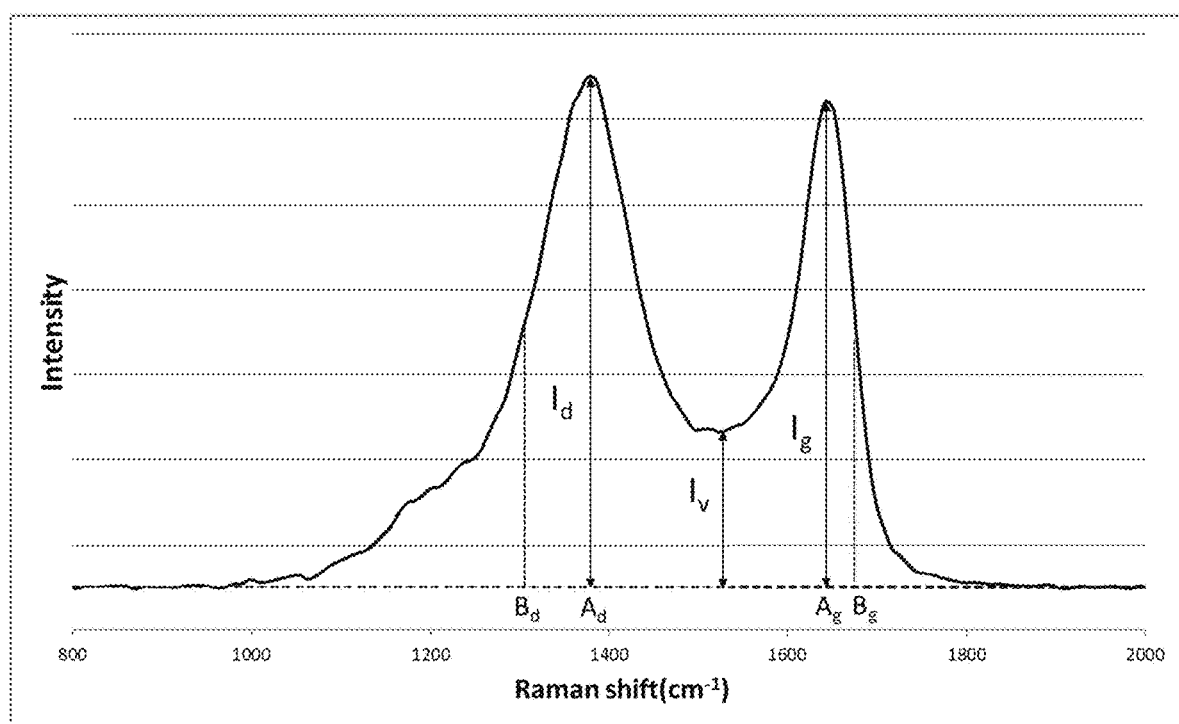
FIG. 5 is an explanatory graph showing an example of evaluation of a Raman spectrum obtained by Raman spectroscopy.

In FIG. 5, there are shown results obtained by analyzing a Raman spectrum obtained by Raman spectroscopy of the metal-supported catalyst obtained in Example 5 as an example of the above-mentioned Raman spectrum. In FIG. 5, the horizontal axis represents a Raman shift ($cm^{-1}$), the vertical axis represents a scattering intensity, the broken line indicates a baseline, $A_d$ represents a Raman shift ($cm^{-1}$) corresponding to the peak top of the D band, $B_d$ represents a Raman shift ($cm^{-1}$) corresponding to a Raman spectrum exhibiting an intensity of half of the intensity $I_d$ of the D band on a low wavenumber side from the $A_d$, $A_g$ represents a wavenumber ($cm^{-1}$) corresponding to the peak top of the G band, and $B_g$ represents a Raman shift ($cm^{-1}$) corresponding to a Raman spectrum exhibiting an intensity of half of the intensity $I_g$ of the G band on a high wavenumber side from the $A_g$.

[Temperature Programmed Desorption Method]

A metal-supported catalyst was installed in a temperature programmed desorption device (manufactured by MicrotracBEL Corp.), and a carrier gas (He) was supplied at 20 mL/min to heat the carbon catalyst. The desorbed gas was measured with a quadrupole mass spectrometer (QMS).

Specifically, first, pretreatment (desorption of catalyst surface functional groups by heat treatment) of the metal-supported catalyst was performed. That is, first, 0.05 g of the metal-supported catalyst was filled into a central portion of a reaction tube made of quartz and set in the temperature programmed desorption device. Pretreatment was performed by heating the reaction tube to 600° C. at a temperature increase rate of 10° C./min in a nitrogen atmosphere and keeping the reaction tube at 600° C. for 30 minutes.

Next, the measurement atmosphere was stabilized. That is, the atmosphere in the device was stabilized by keeping the reaction tube at 25° C. for 120 minutes in a helium (He) atmosphere. After that, the metal-supported catalyst was subjected to heating treatment, and the amount of nitrogen desorption in each of the temperature range of from 600° C. to 1,000° C. and the temperature range of from 800° C. to 1,000° C. was measured. That is, after the above-mentioned stabilization, the metal-supported catalyst was heated again and increased in temperature to 1,000° C. at a temperature increase rate of 10° C./min, to thereby perform heating treatment of the metal-supported catalyst, and the amount of nitrogen functional groups on the surface thereof was measured.

More specifically, the metal-supported catalyst was subjected to heating treatment, and the amount of desorbed nitrogen gas ($N_2$) was measured. That is, after the atmosphere in the device was stabilized, the reaction tube was increased in temperature to 1,000° C. at a temperature increase rate of 10° C./min. During this increase in temperature to 1,000° C., while a helium (He) gas was supplied at 20 mL/min, nitrogen generated by desorption of a nitrogen-containing compound was detected with a mass number of 14 (when a mass number of 28 is used, gases such as CO and $C_2H_4$ are also contained in addition to $N_2$ (in particular, CO is mainly contained), and hence a mass number of 14 was used). First, the obtained spectrum was subjected to baseline correction, and after that, the correlation between the temperature (horizontal axis) and the detection intensity (vertical axis) was recorded.

Then, the integral value of a detection intensity (detection intensity area) of nitrogen in each of the temperature range of from 600° C. to 1,000° C. and the temperature range of from 800° C. to 1,000° C. was calculated, to thereby determine a release amount of nitrogen desorbed in each of the temperature ranges.

Meanwhile, a calibration curve showing the correlation between the release amount of nitrogen and the detection intensity area was created through use of a nitrogen gas as a standard gas. Then, the value quantified based on the detection intensity area obtained by the measurement and the calibration curve was divided by the amount of the carbon catalyst used in the measurement, to thereby determine the nitrogen desorption amount from the metal-supported catalyst (release amount of desorbed nitrogen gas per unit weight of the metal-supported catalyst) (μmol/g).

In addition, based on the nitrogen desorption amount (μmol/g) per unit weight of the metal-supported catalyst obtained as described above and the above-mentioned metal content (wt %) obtained by ICP-MS, the nitrogen desorption amount (μmol/g-carrier) per weight of the carbon carrier contained in the metal-supported catalyst was also calculated. That is, the nitrogen desorption amount from the metal-supported catalyst was divided by the weight ratio of the carbon carrier contained in the metal-supported catalyst calculated by the following equation, to thereby calculate the nitrogen desorption amount (μmol/g-carrier) per weight of the carbon carrier: weight ratio of carbon carrier=1−(metal content (wt %) obtained by ICP-MS))/100.

[Effective Platinum Catalyst Surface Area (ECSA)]

Cyclic voltammetry (CV) measurement was performed on the metal-supported catalyst produced as described above through use of a rotating disc electrode measurement method. First, 500 μL of an aqueous solution prepared by mixing 5.0 mg of a metal-supported catalyst, distilled water, and isopropyl alcohol in a weight ratio of 8:2, and 50 μL of an electrolyte resin solution (DE2020CS, manufactured by DuPont, electrolyte resin concentration: 20 wt %) were mixed. The obtained suspension was subjected to ultrasonic dispersion treatment for 5 minutes, and then further subjected to dispersion treatment using a homogenizer for 2 minutes, to thereby obtain a catalyst ink.

Next, the obtained catalyst ink was applied to a rotating disc electrode so that the supported amount of the metal-supported catalyst (sum of the supported amount of the Pt particles and the supported amount of the carbon carrier) became 0.1 mg/cm$^2$, and dried with a dryer to form a catalyst layer. Then, the rotating disc electrode having the catalyst layer formed thereon was installed in an electrochemical cell (XX manufactured by BAS Inc.). In the electrochemical cell, a reversible hydrogen electrode (RHE) was used as a reference electrode, and a 0.1 M perchloric acid aqueous solution was used as an electrolytic solution. The electrolytic solution was saturated with a nitrogen gas for 10 minutes, and potential scanning was performed for 5 cycles from a low potential of 0.06 V to a high potential of 1.2 V at a scanning speed of 0.05 V/sec.

Of the current values at the time of cathode sweep in the stable 5th cycle from the obtained cycles, the electric quantity caused by a non-Faraday current in a potential range of from 0.06 V to 0.40 V based on a reduction current value at the time of 0.40 V was subtracted from the electric quantity of a reduction current value in the potential range of from 0.06 V to 0.40 V of a cyclic voltammogram, to thereby obtain a hydrogen adsorption electric quantity (unit: C).

The hydrogen adsorption electric quantity was divided by the theoretical area-equivalent electric quantity (2.10 C/m$^2$) of hydrogen adsorption with respect to platinum and further divided by the weight (g) of platinum, to thereby calculate an effective platinum catalyst surface area (m$^2$/g-platinum) in hydrogen adsorption (hereinafter referred to as "$H_2$-ECSA (electrochemical surface area)").

Meanwhile, CO stripping voltammetry measurement was performed through use of a rotating disc electrode. First, a rotating disc electrode was produced by the same method as that of the above-mentioned CV measurement, and installed in an electrochemical cell. A reference electrode and an electrolytic solution were also prepared in the same manner as in the above-mentioned CV.

Then, pretreatment was performed. That is, the electrolytic solution was saturated with a nitrogen gas for 10 minutes, and potential scanning was performed for 20 cycles from a low potential of 0.06 V to a high potential of 1.2 V at a scanning speed of 0.1 V/sec.

After the completion of the above-mentioned pretreatment, CV measurement was performed by the same method as that of the above-mentioned CV measurement. Next, a 0.3% CO gas was saturated for 5 minutes, and then, potential scanning was performed for 5 cycles from a low potential of 0.06 V to a high potential of 1.2 V at a scanning speed of 0.1 V/sec while the rotating disc electrode was rotated at 1,600 rpm.

After that, a voltage of 0.05 V was applied, and the rotating disc electrode was kept for 40 minutes while being rotated at 1,600 rpm. A voltage of 0.05 V was applied while the electrolytic solution was saturated with a nitrogen gas for another 10 minutes, and the rotating disc electrode was rotated at 1,600 rpm. Then, potential scanning was performed for 5 cycles from a low potential of 0.06 V to a high potential of 1.2 V at a scanning speed of 0.05 V/sec.

Of the current values at the time of anode sweep in the first cycle thus obtained, the electric quantity caused by a non-Faraday current in a potential range of from 0.6 V to 1.1 V based on a reduction current value at the time of 0.6 V was subtracted from the electric quantity of a reduction current value in the potential range of from 0.6 V to 1.1 V of a cyclic voltammogram, to thereby obtain a CO adsorption electric quantity (unit: C).

The CO adsorption electric quantity was divided by the theoretical area-equivalent electric quantity (4.20 C/m$^2$) of CO adsorption with respect to platinum and further divided by the weight (g) of platinum, to thereby calculate an effective platinum catalyst surface area (m$^2$/g-platinum) in CO adsorption (hereinafter referred to as "CO-ECSA").

[Pt Equivalent of Non-Platinum Active Site]

First, through use of a commercially available platinum catalyst (UNPC40-II, manufactured by Ishifuku Metal Industry Co., Ltd.), five membrane electrode assemblies (MEAs) in which the supported amount of platinum per unit cathode area was 0.012 mg/cm$^2$, 0.028 mg/cm$^2$, 0.045 mg/cm$^2$, 0.067 mg/cm$^2$, and 0.100 mg/cm$^2$ were produced. The platinum catalyst was formed of carbon black serving as a carrier and 39 wt % of platinum particles supported on the carrier.

Next, a power generation test was performed through use of each of the plurality of MEAs. That is, hydrogen and oxygen were supplied to an anode side and a cathode side, respectively, and a current was swept under the conditions of a cell temperature of 75° C. and a relative humidity of 100% RH, to thereby obtain a correlation between the voltage (mV) at a current density of 0.1 A/cm$^2$ and the supported amount of platinum of the MEA. As a result, the voltage when the MEA having a supported amount of platinum of 0.012 mg/cm$^2$ was used was lower by 120 mV than the voltage (hereinafter referred to as "reference voltage") when the MEA having a supported amount of platinum of 0.1 mg/cm$^2$ was used.

Meanwhile, an MEA containing a carbon carrier that did not support catalyst metal particles, instead of the above-mentioned commercially available platinum catalyst, was produced. A power generation test was performed in the same manner as in the above-mentioned case of using the commercially available platinum catalyst, and the voltage (mV) at a current density of 0.1 A/cm$^2$ was measured.

Specifically, for example, in a power generation test using an MEA containing the carbon carrier A in an amount of 0.3 mg/cm$^2$, the voltage (mV) at a current density of 0.1 A/cm$^2$ was lower by 120 mV than the above-mentioned reference voltage. Accordingly, it was recognized that the carbon carrier A in an amount of 0.3 mg/cm$^2$ had catalytic activity corresponding to that of the platinum catalyst in an amount of 0.012 mg/cm$^2$. That is, the carbon carrier A in an amount of 0.1 mg/cm$^2$ was evaluated as having catalytic activity corresponding to that of the platinum catalyst in an amount of 0.004 mg/cm$^2$.

Herein, for example, when the metal-supported catalyst of Example 5 (content of platinum particles: 20 wt %, content of carbon carrier A: 80 wt %) is used, instead of the above-mentioned commercially available platinum catalyst, in the cathode catalyst layer of the above-mentioned power generation test in such an amount that the platinum content becomes 0.1 mg/cm$^2$, the content of the carbon carrier A in the cathode catalyst layer (content in the metal-supported catalyst: 80 wt %) becomes 0.4 mg/cm$^2$, and the content of the metal-supported catalyst becomes 0.5 mg/cm$^2$.

Herein, as described above, the carbon carrier A in an amount of 0.1 mg/cm$^2$ has catalytic activity corresponding to that of the platinum catalyst in an amount of 0.004 mg/cm$^2$. Because of this, a cathode catalyst layer containing the carbon carrier A in an amount of 0.4 mg/cm$^2$ is evaluated as having catalytic activity corresponding to that of the platinum catalyst in an amount of 0.016 mg/cm$^2$. Then, the amount of 0.016 mg/cm$^2$ of the platinum catalyst having catalytic activity corresponding to that of the carbon carrier A in an amount of 0.4 mg/cm$^2$ was divided by the supported amount (0.0004 g/cm$^2$) of the carbon carrier A, to thereby calculate a platinum equivalent of 40.0 (mg-Pt/g-carrier) of non-platinum active sites in the carbon carrier A.

[Initial Performance and Durability]

A battery cathode having a catalyst layer containing a metal-supported catalyst formed thereon was produced. That is, first, an electrolyte (EW700) in such an amount that the weight ratio to a carbon carrier was 0.9 was added to 0.25 g of a metal-supported catalyst, and 2 g each of distilled water and 1-propanol were added to prepare an electrolyte solution. The electrolyte solution and 25 g of balls were loaded into a pot and mixed with a ball mill at 200 rpm for 50 minutes, to thereby obtain a slurry-like composition for a catalyst layer containing the uniformly dispersed metal-supported catalyst.

The obtained slurry-like composition for a catalyst layer was applied onto a region of an area of 5 cm$^2$ of a gas diffusion layer ("29BC", manufactured by SGL Carbon Japan Co., Ltd.) (2.3 cm×2.3 cm) so that the content of the metal-supported catalyst per unit area of the battery electrode became 1.5 mg/cm$^2$, and dried to form a catalyst layer on the gas diffusion layer. In this manner, a battery electrode having a catalyst layer containing a metal-supported catalyst formed thereon was obtained.

Next, a fuel cell including a battery electrode having a catalyst layer containing a metal-supported catalyst formed thereon was produced. That is, as a positive electrode, a battery electrode including a catalyst layer (positive electrode catalyst layer) produced as described above was used.

Meanwhile, a negative electrode was produced as described below. 0.5 g of Pt/C (UNPC40-II, manufactured by Ishifuku Metal Industry Co., Ltd.), 10 g of 5% NAFION (trademark), 2 g of distilled water, and 25 g of balls were loaded into a pot and mixed with a ball mill at 200 rpm for 50 minutes, to thereby prepare a slurry-like Pt/C composition. A negative electrode including a catalyst layer (negative electrode catalyst layer) formed of the Pt/C composition was produced in the same manner as in the above-mentioned positive electrode except that the slurry-like Pt/C composition was applied onto the gas diffusion layer (5 cm$^2$) so that the amount of Pt/C applied per unit area became 0.1 mg/cm$^2$.

Then, a solid polymer electrolyte membrane ("NAFION™ 211", manufactured by DuPont) was arranged between the above-mentioned positive electrode catalyst layer and the above-mentioned negative electrode catalyst layer, and the resultant was subjected to pressure bonding under the conditions of 150° C. and 1 MPa for 3 minutes, to thereby produce an MEA. A pair of gaskets were bonded to the MEA, and further, the resultant MEA was sandwiched between a pair of separators, to thereby produce a fuel cell unit cell.

After that, the unit cell produced as described above was installed in a fuel cell automatic evaluation system (manufactured by Toyo Corporation). First, a power generation test was performed, and then a durability test was performed.

In the power generation test, saturated humidified air (oxygen) was supplied at 2.5 L/min (relative humidity:

100%) to a positive electrode side of the unit cell at a back pressure of 70 kPa, and saturated humidified hydrogen was supplied at 1.0 L/min (relative humidity: 100%) to a negative electrode side of the unit cell. The cell temperature was set to 75° C., and the open circuit voltage was measured for 5 minutes. After that, the cell current density was kept at each current density for 3 minutes from 1.5 A/cm$^2$ to 0 A/cm$^2$, and the cell voltage was measured. In the power generation test, the voltage (mV) observed at a current density of 0.2 A/cm$^2$ was recorded as one of indicators exhibiting the initial catalytic activity of the metal-supported catalyst.

In addition, the output density obtained from a potential and a current density was calculated for each potential, and the highest value was measured as a maximum output density (mW/cm$^2$). In addition, the voltage (mV) at 1.0 A/cm$^2$ at the start of the durability test was recorded.

After that, the cell temperature was set to 75° C. Saturated humidified nitrogen was supplied at 0.5 L/min (relative humidity: 100%) to both sides of the unit cell at a back pressure of 35 kPa, and saturated humidified hydrogen was supplied at 0.5 mL/min (relative humidity: 100%) to an anode side of the unit cell. The durability test was performed by repeating a rectangular wave cycle of keeping a potential at 0.6 V for 30 seconds and at 1.0 V for 60 seconds.

After the above-mentioned rectangular wave cycle was repeated 2,100 times, the power generation test was performed again. The voltage (mV) at 1.0 A/cm$^2$ after the durability test was recorded. Then, the value obtained by subtracting the above-mentioned voltage (mV) (voltage (mV) after the 2,100 cycles) measured in the power generation test after the durability test from the above-mentioned voltage (mV) measured as the initial performance in the power generation test before the durability test was obtained as a voltage decrease amount (mV) after the 2,100 cycles.

[Results]

In FIG. 6A, FIG. 6B, and FIG. 6C, there are shown results obtained by evaluating the characteristics of the metal-supported catalyst of each example. As shown in FIG. 6A, the initial performance and durability of each of the MEAs using the metal-supported catalysts of Examples 2 to 6 were superior to those of Examples 1 and 7 to 9. In addition, the voltage at a current density of 0.2 A/cm$^2$ of each of the MEAs using the metal-supported catalysts of Examples 3 to 6 was particularly high. In addition, the durability of each of the MEAs using the metal-supported catalysts of Examples 3 to 6 was particularly high.

As shown in FIG. 6A, the pure Pt proportion of each of the metal-supported catalysts of Examples 2 to 6 was more than 0% and less than 61.3% (specifically, 20.1% or more and 52.3% or less), and the pure Pt proportion of each of Examples 3 to 6 was more than 20.1% and less than 61.3% (specifically, 39.4% or more and 52.3% or less). In addition, the N-CHN/XPS ratio of each of Examples 1 to 6, 8 and 9 was significantly higher than that of Example 7.

As shown in FIG. 6A and FIG. 6C, the volumes of the first pores of the metal-supported catalysts of Examples 1, 3 to 6, and 9 were larger than those of the other Examples. In addition, the volumes of the second pores of the metal-supported catalysts of Examples 1, 3 to 7, and 9 were larger than those of the other Examples. In addition, the volumes of the third pores of the metal-supported catalysts of Examples 7 and 8 were larger than those of the other Examples.

The invention claimed is:

1. A metal-supported catalyst, comprising:
   a carbon carrier; and
   platinum particles serving as catalyst metal particles supported on the carbon carrier,
   wherein the platinum particles contain pure platinum particles and platinum alloy particles,
   wherein a proportion of an area of a separation peak derived from the pure platinum particles to a sum of the area of the separation peak derived from the pure platinum particles and an area of a separation peak derived from the platinum alloy particles, wherein the separation peaks are obtained by separating a diffraction line having a diffraction angle 2θ in a range of from 36° to 44° in a powder X-ray diffraction pattern by a CuKα ray, is 15% or more and 61% or less, and
   wherein a ratio of a proportion of a nitrogen atom content to a carbon atom content measured by elemental analysis using a combustion method, to a proportion of a nitrogen atom content to a carbon atom content measured by X-ray photoelectron spectroscopy, is 1.05 or more.

2. The metal-supported catalyst according to claim 1, wherein a volume of pores each having a diameter of 0.5 nm or more and 2.0 nm or less per unit weight of the carbon carrier is 0.20 (cm$^3$/g-carrier) or more.

3. The metal-supported catalyst according to claim 1, wherein an average crystallite diameter of the platinum particles calculated by Scherrer equation through use of a diffraction angle and a full width at half maximum of one or more diffraction peaks obtained by separating a diffraction line having a diffraction angle 2θ in a range of from 36° to 44° in a powder X-ray diffraction pattern by a CuKα ray is 10.0 nm or less.

4. The metal-supported catalyst according to claim 1, wherein a proportion of an amount of platinum particles, in which an average crystallite diameter thereof calculated by Scherrer equation through use of a diffraction angle and a full width at half maximum of one or more diffraction peaks obtained by separating a diffraction line having a diffraction angle 2θ in a range of from 36° to 44° in a powder X-ray diffraction pattern by a CuKα ray is 5.0 nm or less, to a total amount of the platinum particles, is 65% or more.

5. The metal-supported catalyst according to claim 1, wherein a normalized specific surface area calculated by multiplying a BET specific surface area by a ratio of a weight of the metal-supported catalyst to a weight of the carbon carrier is 800 (m$^2$/g-carrier) or more.

6. The metal-supported catalyst according to claim 1, wherein the platinum alloy particles each contain a platinum alloy of platinum and a transition metal.

7. The metal-supported catalyst according to claim 1, wherein an electrochemical surface area (CO-ECSA) obtained by dividing a carbon monoxide adsorption electric quantity measured in stripping voltammetry using a rotating disc electrode containing the metal-supported catalyst by a theoretical area-equivalent electric quantity of carbon monoxide adsorption to platinum and a weight of platinum supported on the metal-supported catalyst is 100.0 m$^2$/g-platinum or less.

8. The metal-supported catalyst according to claim 1, wherein a ratio of a nitrogen atom concentration to a carbon atom concentration measured by X-ray photoelectron spectroscopy is 0.010 or more.

9. The metal-supported catalyst according to claim 1, wherein the metal-supported catalyst has a carbon structure that exhibits a full width at half maximum of 160 cm$^{-1}$ or less of a D band having a peak top in a range of 1,250 cm$^{-1}$ or more and 1,450 cm$^{-1}$ or less in a Raman spectrum obtained by Raman spectroscopy.

10. The metal-supported catalyst according to claim 1, wherein the metal-supported catalyst has a carbon structure that exhibits a full width at half maximum of 90 cm$^{-1}$ or less of a G band having a peak top in a range of 1,550 cm$^{-1}$ or more and 1,700 cm$^{-1}$ or less in a Raman spectrum obtained by Raman spectroscopy.

11. The metal-supported catalyst according to claim 1, wherein the metal-supported catalyst has a carbon structure that exhibits a ratio, of a minimum intensity between a G band having a peak top in a range of 1,550 cm$^{-1}$ or more and 1,700 cm$^{-1}$ or less and a D band having a peak top in a range of 1,250 cm$^{-1}$ or more and 1,450 cm$^{-1}$ or less, to an intensity of the G band, in a Raman spectrum obtained by Raman spectroscopy, of 0.20 or more and 0.50 or less.

12. The metal-supported catalyst according to claim 1, wherein the metal-supported catalyst has a carbon structure that exhibits a nitrogen desorption amount of 1.00×10$^{-5}$ (mol/g-carrier) or more from 600° C. to 1,000° C. per unit weight of the carbon carrier in a temperature programmed desorption method.

13. The metal-supported catalyst according to claim 1, wherein the metal-supported catalyst has a carbon structure that exhibits a nitrogen desorption amount of 1.00×10$^{-5}$ (mol/g-carrier) or more from 800° C. to 1,000° C. per unit weight of the carbon carrier in a temperature programmed desorption method.

14. A battery electrode, comprising the metal-supported catalyst of claim 1.

15. A battery, comprising the battery electrode of claim 14.

* * * * *